(12) United States Patent
Gariepy et al.

(10) Patent No.: US 8,521,339 B2
(45) Date of Patent: Aug. 27, 2013

(54) METHOD AND SYSTEM FOR DIRECTING UNMANNED VEHICLES

(75) Inventors: Ryan Gariepy, Waterloo (CA); Dave Kroetsch, Kitchener (CA); Steffen Lindner, Waterloo (CA); Mike Peasgood, Waterloo (CA)

(73) Assignee: Aeryon Labs Inc., Waterloo (CA)

( * ) Notice: Subject to any disclaimer, the term of this patent is extended or adjusted under 35 U.S.C. 154(b) by 411 days.

(21) Appl. No.: 12/555,925

(22) Filed: Sep. 9, 2009

(65) Prior Publication Data

US 2010/0084513 A1 Apr. 8, 2010

Related U.S. Application Data

(60) Provisional application No. 61/191,426, filed on Sep. 9, 2008.

(51) Int. Cl.
*G05D 1/00* (2006.01)

(52) U.S. Cl.
USPC .............................................. 701/2; 244/190

(58) Field of Classification Search
USPC ............................................ 701/2; 244/190
See application file for complete search history.

(56) References Cited

U.S. PATENT DOCUMENTS

| | | | |
|---|---|---|---|
| 6,122,572 A | 9/2000 | Yavnai | |
| 6,535,793 B2 | 3/2003 | Allard | |
| 6,584,382 B2 | 6/2003 | Karem | |
| 6,694,228 B2 | 2/2004 | Rios | |
| 6,856,894 B1 | 2/2005 | Bodin et al. | |
| 7,107,148 B1 | 9/2006 | Bodin et al. | |
| 7,130,741 B2 | 10/2006 | Bodin et al. | |
| 7,158,877 B2 | 1/2007 | Carlsson et al. | |
| 7,228,232 B2 * | 6/2007 | Bodin et al. | 701/301 |
| 7,231,294 B2 | 6/2007 | Bodin et al. | |
| 7,302,316 B2 | 11/2007 | Beard et al. | |
| 7,343,232 B2 | 3/2008 | Duggan et al. | |
| 7,469,183 B2 | 12/2008 | Bodin et al. | |
| 7,873,444 B1 * | 1/2011 | Ehrmantraut et al. | 701/2 |
| 2004/0044444 A1 * | 3/2004 | Johnson et al. | 701/3 |
| 2009/0125163 A1 * | 5/2009 | Duggan et al. | 701/2 |
| 2009/0187299 A1 * | 7/2009 | Fregene et al. | 701/23 |
| 2009/0327542 A1 * | 12/2009 | Lundqvist | 710/105 |
| 2010/0250022 A1 * | 9/2010 | Hines et al. | 701/2 |

\* cited by examiner

*Primary Examiner* — Thomas Black
*Assistant Examiner* — Shardul Patel
(74) *Attorney, Agent, or Firm* — DiBerardino McGovern IP Group LLC

(57) ABSTRACT

A method of remotely controlling an aerial vehicle within an environment, including providing a control station in communication with the aerial vehicle, providing a map of the environment, receiving target world coordinates for the aerial vehicle within the environment, determining a desired velocity vector to direct the aerial vehicle to the target world coordinates at a speed proportional to the distance between the aerial vehicle and the target world coordinates, and directing the aerial vehicle along the desired velocity vector until the aerial vehicle reaches the target world coordinates.

26 Claims, 20 Drawing Sheets

METHOD AND SYSTEM FOR DIRECTING UNMANNED VEHICLES

CROSS REFERENCE TO RELATED APPLICATIONS

This application claims the benefit of priority of U.S. Provisional Patent Application No. 61/191,426 filed Sep. 9, 2008, which is incorporated herein by reference in its entirety.

FIELD

The present application relates generally to command and control of unmanned aerial vehicles ("UAVs"). More particularly, the present application relates to a simple and intuitive control method and system for a single or multiple UAV system, where each UAV can have a varying degree of autonomy.

BACKGROUND

Remote-controlled UAVs with camera capability have been known for many years. UAVs are used to provide visual reconnaissance for areas which are typically inaccessible by humans. These types of UAVs include a hovering UAV which is lifted and controlled by independently driven rotors or propellers. By varying the thrust generated by each of the rotors, the orientation and speed of the UAV can be controlled. Various designs have been proposed for such a UAV, the primary requirement of which is to rigidly mount the rotors at fixed distances from the center of the craft, while minimizing the weight of the structure.

Use of a hovering UAV is especially effective for providing digital imagery or real-time digital video from aerial vantage points. For instance, first responders to a natural disaster or train derailment can benefit from this aerial vantage point to help determine the imminent danger of the situation. Alternatively, a hovering UAV can also be used as a security measure to provide a mobile, airborne security system.

Direct manual control of a hovering UAV requires a great deal of skill and training, and controlling a hovering UAV in such a way requires the user's constant undivided attention. Thus, automation in stabilizing and maintaining flight of a hovering UAV is desirable and has been known for many years. However, directing the course of such an automated hovering UAV may remain challenging and require skill and training in order to make effective use of a hovering UAV.

U.S. Pat. No. 6,694,228, issued on Feb. 17, 2004 to Rios, teaches a control system for a UAV that includes control translations. The system taught by Rios maximizes operational employment of the UAV payload. By determining spatial references, and then using the references to transform the control stick commands, the operator treats the UAV as a point source. For control through imagery from onboard mission sensors, the transformations provide for the UAV to move itself and achieve payload orientation.

It is, therefore, desirable to provide a simplified user-interface that allows a user with little or no training or experience, e.g. no special skills, to effectively operate a hovering UAV or group of hovering UAVs, and which further allows such a user to control multiple partially-automated functions of one or more hovering UAVs within a group of hovering UAVs.

SUMMARY

It is an object herein to obviate or mitigate at least one disadvantage of previous methods and systems of directing or navigating an aerial vehicle.

The present application is intended to provide an intuitive method for planning, executing, and reviewing missions undertaken by a single or multiple hovering UAV system, where each hovering UAV may be capable of a dynamically-varying level of autonomy. Methods are provided to allow full mission planning and control on a variety of controller form factors with a multitude of input methods, allowing for a high degree of system flexibility and mobility of the system users. The control interface provides the ability to set boundaries and exclusion zones in concert with the designation of preferred routes, target locations, and home positions. The method causes UAVs to autonomously override operator instructions if it is determined that they would otherwise pass into one of the user-defined restricted areas. The control interface also provides the ability to set desired locations the system should be interacting with/observing, areas which UAVs should return to upon mission completion or system failure, and predetermined preferred routes. The user is able to modify all of these aspects before, during, and after the execution of the mission. Performing these operations in parallel allows mission plans to be developed, deployed, and modified quickly. The stateless, integrated design allows for switching between vehicles in different modes of operation while still providing important data on the status of the entire system, increasing the ease-of-use of the system and improving the ability of the supervisor to effectively control multiple vehicles.

Individual UAVs controlled by the method herein described may be in different states from each other at any given time during system operation and may thus require the user to perform different tasks, those tasks not being limited to navigating or directly controlling the UAVs. Examples of such tasks include pre-mission checks, UAV configuration, mission execution, on-line mission modification, manual override, and post-mission review. Where a multitude of UAVs are being controlled, the user may need to quickly switch between UAVs in different modes. The system does not hinder the operator in this task, whether by requiring the switching of control methods, communication settings, or the performance of other extraneous tasks.

The deployment of this system may be for a task which does not allow the transportation or operation of a great deal of support infrastructure. It is therefore advantageous that the user is able to operate the entire system from a device with a small form factor, such as a sufficiently capable smartphone or a small tablet PC. For ease of use, the method for system control and the graphical user interface ("GUI") may be consistent across the range of possible devices.

The control method herein is intended to be flexible enough to design missions with a reasonable amount of complexity, while still being simple enough to operate via a point-and-touch interface on a mobile device. The control method further combines a high level of vehicle automation with intuitive user controls and displays such that a substantial reduction in the required skill level and training of the user is achieved.

In a first aspect, there is provided a method of remotely controlling an aerial vehicle within an environment, including providing a control station in communication with the aerial vehicle, providing a visual representation of the environment (such as a map or aerial view), receiving target world coordinates for the aerial vehicle within the environment, determining a desired velocity vector to direct the aerial vehicle to the target world coordinates, and directing the aerial vehicle along the desired velocity vector until the aerial vehicle reaches the target world coordinates.

In one embodiment, the desired velocity vector includes a speed proportional to the distance between the aerial vehicle and the target world coordinates.

In one embodiment, the method further includes directing the aerial vehicle to cease travelling to the target world coordinates and to remain at a current position if the user ceases to provide input providing target world coordinates.

In one embodiment, the method further includes recalculating the desired velocity vector as the aerial vehicle travels towards the target world coordinates to reduce the speed of the aerial vehicle as it approaches the target world coordinates.

In one embodiment, the method further includes automatically directing the aerial vehicle to remain at a current position if to continue travelling along the desired velocity vector would otherwise direct the aerial vehicle into a no-fly zone.

In one embodiment, the method further includes automatically directing the aerial vehicle to remain at a current position prior to beginning to travel along the vector if to travel along the vector would at any point direct the aerial vehicle into a no-fly zone.

In one embodiment, the method further includes automatically directing the aerial vehicle to remain at a current position if to continue travelling along the desired velocity vector would otherwise direct the aerial vehicle outside a perimeter.

In one embodiment, the method further includes automatically directing the aerial vehicle to remain at a current position prior to beginning to travel along the vector if to travel along the vector would at any point direct the aerial vehicle outside a perimeter.

In one embodiment, the method further includes selecting a maximum speed which the aerial vehicle will not exceed.

In one embodiment, the method further includes directing the aerial vehicle to take an action upon reaching the target world coordinates.

In one embodiment, the method further includes controlling one or more functions of one or more of the aerial vehicles by multiple control stations.

In one embodiment, the target world coordinates are received by a graphical user interface. In one embodiment, the graphical user interface is a touch interface for use with a users finger or a stylus etc.

In one embodiment, the user provides the target world coordinates by touching a target position icon on the visual representation of the environment. While the user provides the target world coordinates by touching a point on the map, the UAV travels to the target world coordinates corresponding to the point.

In one embodiment, the aerial vehicle remains at a current position if the user ceases to touch the target position icon. If the user ceases to touch the target position icon on the map, the UAV stops moving towards the target world coordinates and hovers in place.

In one embodiment, the method further includes defining a flight parameter within the environment. In one embodiment, the flight parameter is selected from the group of a no-fly zone, a perimeter, a target, a home location, or a combination thereof. In one embodiment, the flight parameter is polygonal or circular in shape.

In one embodiment, the method further includes providing a sensory payload on the aerial vehicle, and transmitting data gathered by the sensory payload, directly or indirectly, to the control station.

In one embodiment, the method further comprises controlling the sensory payload independently of the aerial vehicle.

In one embodiment, the method further comprises directing a plurality of aerial vehicles from the control station.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Communication Network

Figure 1:
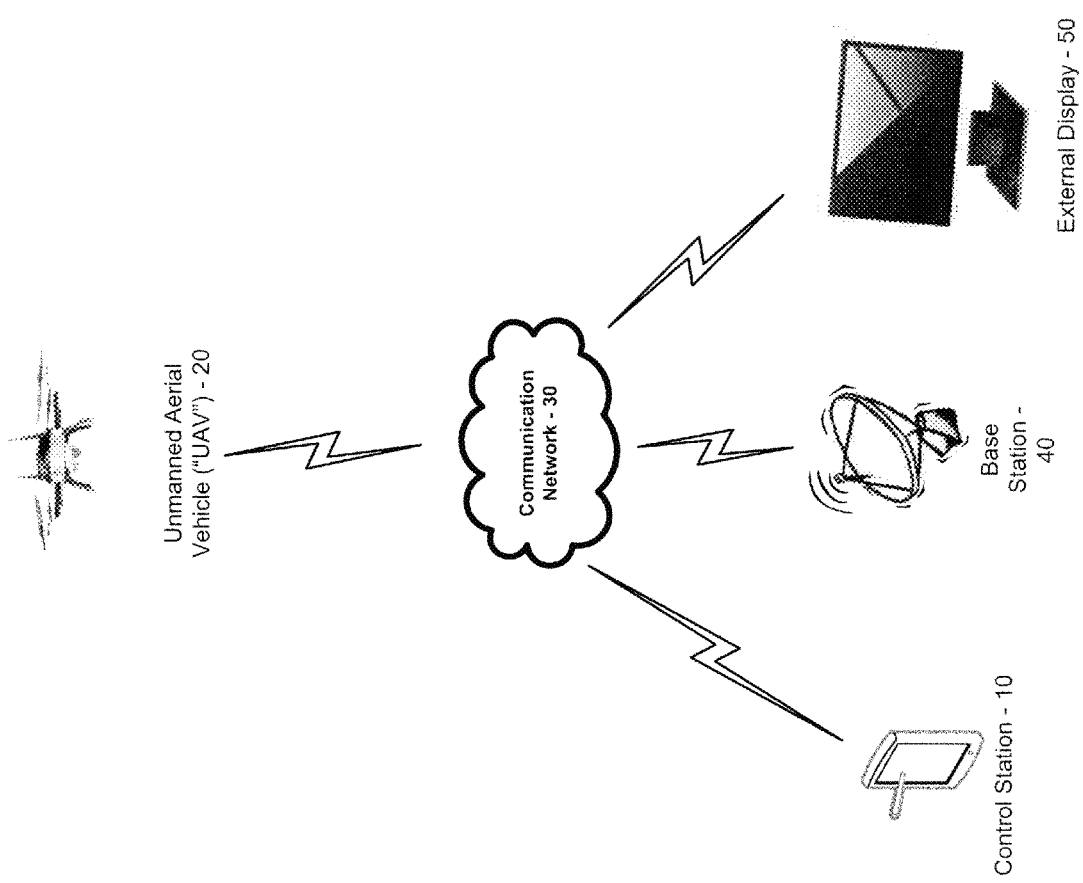
FIG. 1 is a schematic of the overall architecture of the network connections for use with the present invention.

FIG. 1 is a schematic of the overall architecture of the network connections for use with the present embodiment. A control station 10 is in wireless communication with a UAV 20 via a communication network 30. While only one UAV 20 is pictured in FIG. 1 and referred to in the following figures, the method also applies to a plurality of UAVs 20 or a plurality of control stations 10 or both. The communication network 30 may include direct communication between the control station 10 and the UAV 20, or a base station 40 may form an intermediary link in the communication network 30, relaying information between the control station 10 and the UAV 20.

The UAV 20 may be any of a number of types of UAVs, but is preferably a rotor-driven UAV of the type described in U.S. patent application Ser. No. 12/465,912, filed May 14, 2009. The UAV 20 is also preferably capable of hovering in a fixed location by automatically adjusting output of the rotors present such that it takes into account and corrects for drift caused by wind or updrafts.

The control station 10 may be any one of a number of general purpose programmable computers or other user interface devices, but is preferably a handheld tablet with a responsive touch-screen. The control station preferably includes a visual display and may provide visual, auditory, and tactile feedback to the user. Functions of the UAV 20 may be controlled from the control station 10 in a simple and intuitive way.

The communication network 30 may also include optional devices such as a base station 40, which may provide extended communication range, and may allow for enhanced localization accuracy of the UAV 20, and an external display 50, which may allow observation of sensor data from the payload of the UAV 20 or of a first GUI or second GUI (FIGS. 2 and 14-20). The external display 50 may be any type of display apparatus, such as a standard computer monitor, television, head-mounted display, or 3-D visualization tool.

Graphical User Interface (GUI)

Figure 2:
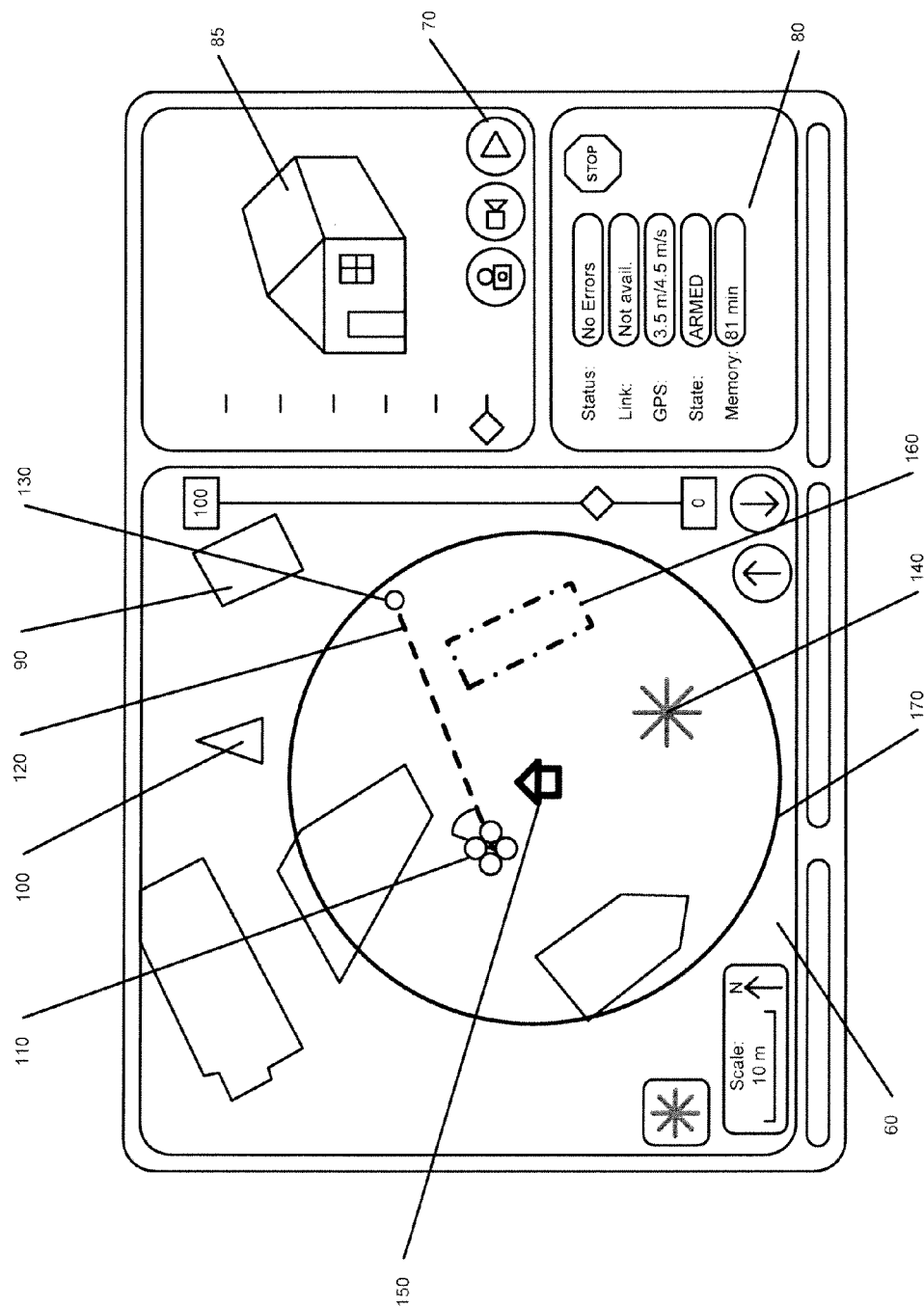
FIG. 2 is a screenshot from a first GUI that may be used to implement the method of the present invention.
Figure 4:
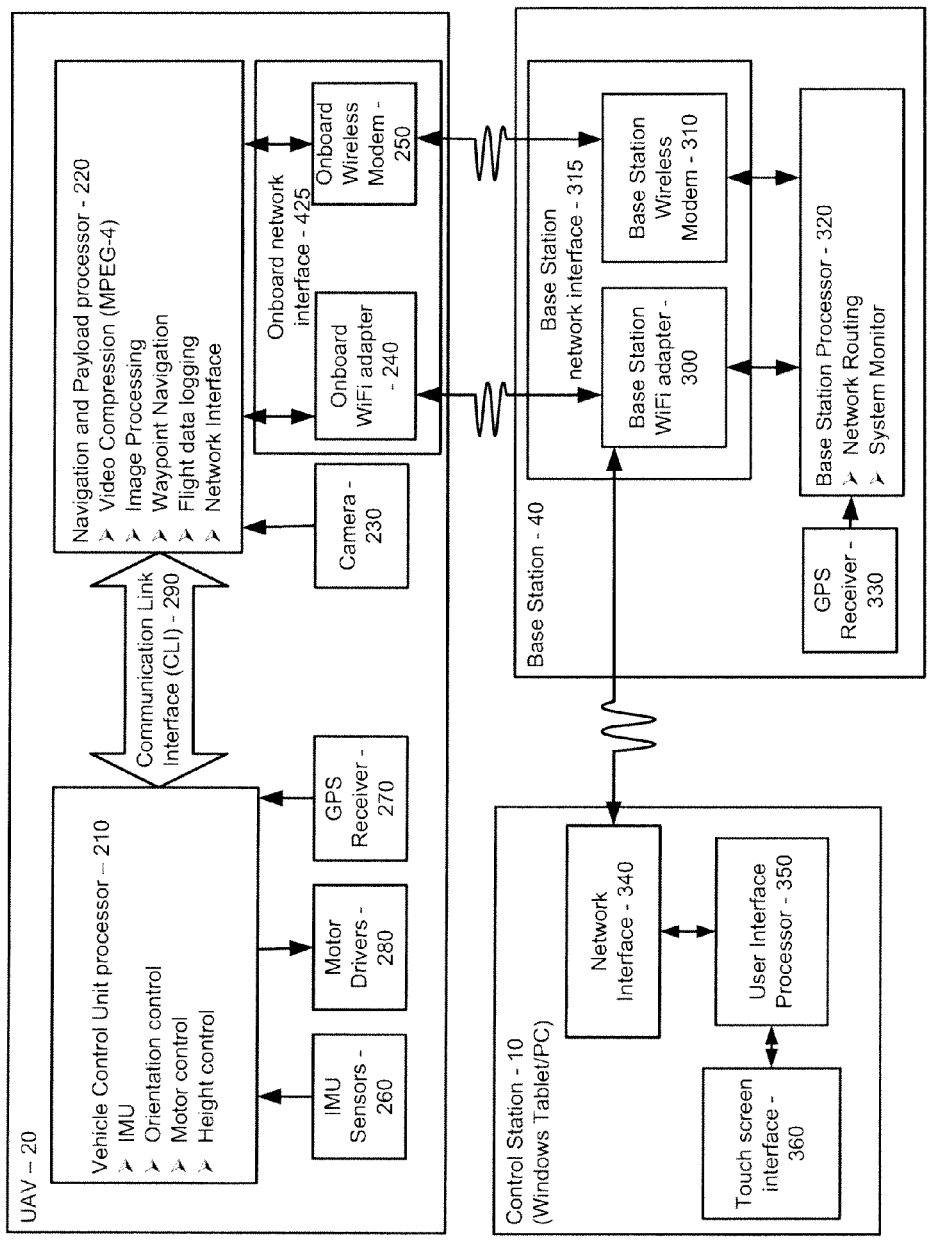
FIG. 4 is a schematic of one embodiment of hardware components to implement the method, and of the function of the hardware components.
Figure 8:
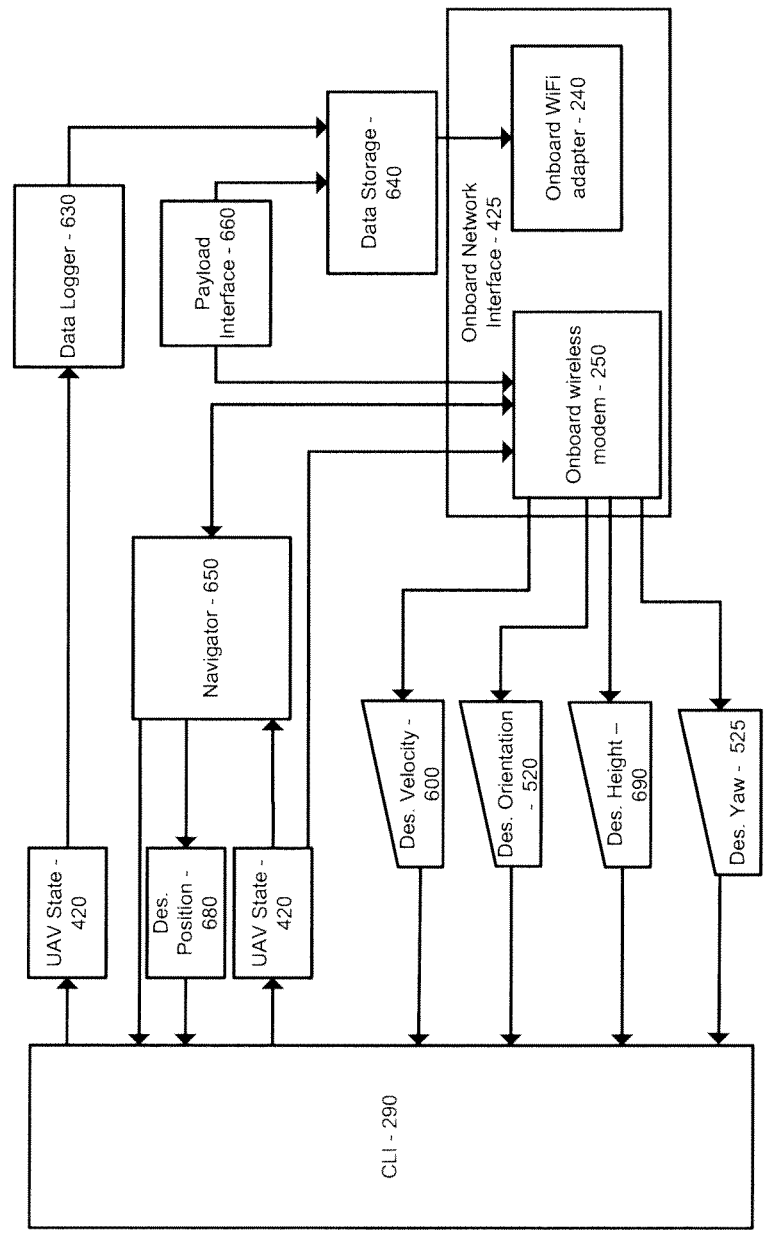
FIG. 8 is a schematic of high-level functional blocks of software components executing on a navigation and payload processor, and flow of data between the software components, and between the software components and associated hardware.

FIG. 2 is a screenshot from a first GUI that may be used to implement the method. The first GUI is divided into three broad sections: a map 60, a payload window 70, and a UAV status window 80. The payload window 70 displays information obtained from the sensory payload, for example video feed 85 from a camera 230 (FIG. 4). The UAV status window 80 displays information regarding status of various aspects of the UAV 20, such as the status of network links, estimated accuracy of a position estimate provided by a global positioning system ("GPS"), and an amount of available data storage 640 (FIG. 8).

Some of the features of the map 60 are shown in FIG. 2; additional features are described below in relation to FIG. 14. The map 60 is a top-down view of the environment in which the UAV 20 is operating and may be obtained from a variety of sources, including satellite feed or a web-based map service. Both man-made features, for example a building 90, and natural features, for example a tree 100, may be visible. Several icons may also be present on the map 60. A UAV icon 110 indicates the position and orientation of the UAV 20. The straight-line path 120 is between the current position of the UAV 20 as indicated by the UAV icon 110, and a target position icon 130, which indicates a target position 875 of a desired velocity vector 600 (FIG. 11) of the UAV 20. A user defines the desired velocity vector 600, and the target position icon 130 and straight-line path 120 is automatically generated.

A sensory payload, such as the camera 230 (FIG. 4) may automatically track to a target 140. The UAV 20 may be directed to automatically proceed to a home location 150. A no-fly zone ("NFZ") 160 and a perimeter 170 are also shown on the map 60. The UAV 20 cannot enter the NFZ 160 or leave the perimeter 170. The UAV 20 will automatically stop and maintain its position if to continue along its straight-line path 120 would cause it to enter the NFZ 160 or leave the perimeter 170. Flight parameters may include the target 140, the home location 150, the NFZ 160, the perimeter 170, and a waypoint 1470 (FIG. 19) may be designed and modified by the user with the control station 10 during or prior to operation of the UAV 20. A combination of flight parameters may define a flight plan, and the flight plan may be designed and modified by the user with the control station 10 during or prior to operation of the UAV 20.

UAV Navigation

Figure 3:
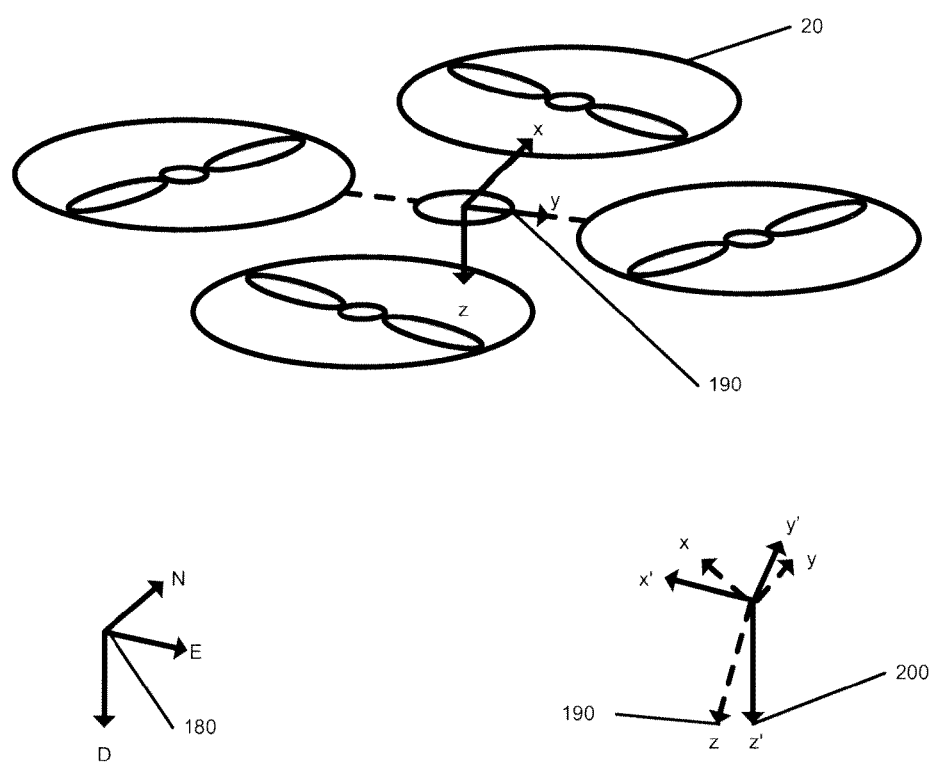
FIG. 3 is a schematic of three coordinate frames that navigate a UAV.

FIG. 3 is a schematic of three coordinate frames that navigate the UAV 20. A global frame 180 defines a coordinate system relative to a fixed point on the surface of the Earth, defined by orthogonal vectors pointing North, East, and Down (N, E, D). The position and velocity of the UAV 20 are controlled with respect to the global frame 180. The orientation of the UAV 20 is defined by a body frame 190, defined by the vectors (x, y, z) pointing from the centre of mass toward the front, right, and bottom of the UAV 20. The roll and pitch of the UAV 20 are shown by comparison to a control coordinate frame 200 in which the (x', y') plane is parallel to the (N, E) plane in the global frame 180.

Hardware

FIG. 4 is a schematic of one embodiment of hardware components to implement the method, and of the function of the hardware components. The UAV 20 includes 2 logical processing components: a vehicle control unit processor 210 and a navigation and payload processor 220. A communication link interface ("CLI") 290 allows communication between the vehicle control unit processor 210 and the navigation and payload processor 220.

The navigation and payload processor 220 performs waypoint navigation, interfaces with payload sensors, and interfaces with the communication network 30 through an onboard network interface 425. Payload sensors commonly include a camera 230, although the payload sensors could also include sensors adapted to detect audio, temperature, biomolecules, or any other target stimulus. The onboard network interface 425 may include an onboard WiFi™ adaptor 240 and an onboard wireless modem 250. The vehicle control unit processor 210 may receive input from inertial measurement ("IMU") sensors 260, and an onboard GPS receiver 270, and controls the controls the position and the orientation of the UAV 20 via motor drivers 280. The IMU sensors preferably include a 3-axis accelerometer, a 3-axis rate gyroscope, and a 3-axis magnetometer.

The base station 40 may include a base network interface 315 which interfaces with the communication network 30. The base network interface 315 may include a base station WiFi™ adaptor 300 and base station wireless modem 310. The base station 40 may also include a base station processor 320 to support network routing and system monitoring, and may include a base station GPS receiver 330 to augment localization of the UAV 20.

The control station 10 may include a network interface 340 to communicate a user interface processor 350, and a touch-screen interface 360. The network interface 340 may allow communication with the UAV 20 and base station 40 over the communication network 30. The user interface processor 350 may process input from the user and information received from the communication network 30 via the network interface 340. The touch-screen interface 360 may receive input from the user and provide visual feedback to the user.

All data sent over an onboard network interface 425 is preferably packetized by a protocol converter into transmitted data suitable for transmission over the communication network 30. Conversely, all data received by the onboard network interface 425 is preferably depacketized by a protocol convertor for interpretation by the relevant processor. The same is true with respect to the base network interface 315 and the network interface 340.

Figure 5:
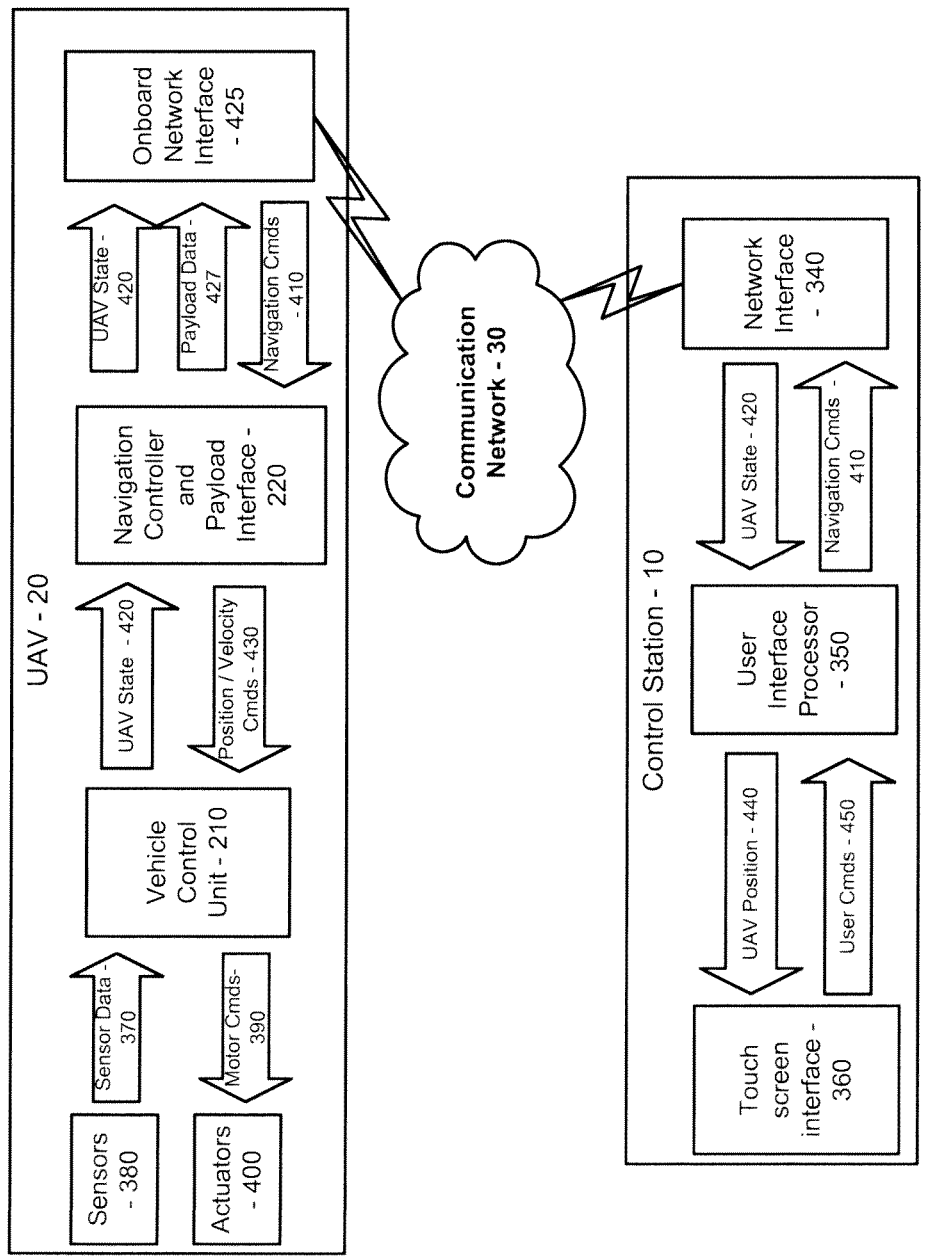
FIG. 5 is a schematic of communication between hardware components which implement the method of the present invention.

FIG. 5 is a schematic of the communication between hardware components which may be used to implement the method. On the UAV 20, sensor data 370 may be captured from sensors 380 and sent to the vehicle control unit processor 210, which in turn provides UAV state 420. Sensors 380 may include IMU sensors 260. The UAV state 420 may include the orientation, position, velocity, height, and motor speeds of the UAV 20. The UAV state 420 is sent to the navigation and payload processor 220 (via the CLI 290; FIG. 4). The navigation and payload processor 220 sends both the UAV state 420 and payload data 427 through the onboard network interface 425 over the communication network 30 to the control station 10. The payload data 427 may be received by the navigation and payload processor 220 from, for example, the camera 230 (FIG. 4).

The control station 10 may receive the UAV state 420 from the communication network 30 at the network interface 340. The user interface processor 350 may receive the UAV state 420 from the network interface 340 and based on the UAV state 420, display a UAV position 440 as the UAV icon 110 at the corresponding location on the map 60 (FIG. 2), which is shown on the first GUI of the touch-screen interface 360.

Figure 6:
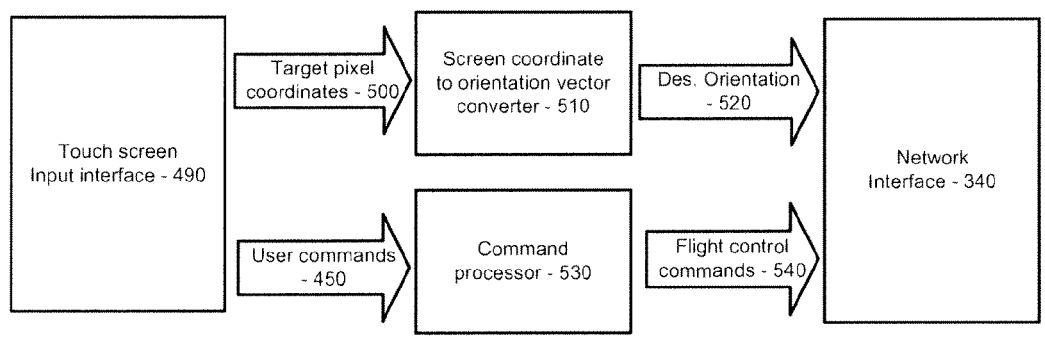
FIG. 6 is a schematic of logic that may be used to generate a desired orientation vector from user input on a touch-screen input interface when manually controlling flight of the UAV.

User commands 450 may be received as presses on the touch-screen interface 360. User commands 450 may correspond to any function of the UAV 20. The user interface processor 350 may transform user commands 450 from pixel coordinates on the display into navigation commands 410. Navigation commands 410 may include desired orientation 520 (FIG. 6), desired velocity vector 600 (FIG. 7), desired height 690 (FIG. 8), and flight control commands 540 (FIG. 6). Flight control commands 540 may include flying to a waypoint, taking off and landing, mode changes, and setting changes. Navigation commands 410 are communicated to the UAV 20 through the network interface 340 and communication network 30. User commands 450 that are not transformed into navigation commands 410 may be sent over the communication network 30 in the same way as navigation commands 410.

The UAV 20 receives navigation commands 410 from the communication network 30 via the onboard network interface 425. The navigation and payload processor 220 receives the navigation commands 410 and converts them into position and velocity commands 430, which are communicated to the vehicle control unit processor 210 (via the CLI 290; FIG. 4). The vehicle control unit processor 210 combines sensor data 370 with position and velocity commands 430 to generate motor commands 390 that will control the orientation of the UAV 20 by varying the speed of actuators 400. The motor commands 390 will cause the UAV 20 to travel according to the navigation commands 410.

Commands to Direct UAV

FIG. 6 is a schematic of logic that may be used to generate a desired orientation vector from user input on a touch-screen input interface 490 when manually controlling flight of the UAV 20. Input through the touch-screen input interface 490 will generate either target pixel coordinates 500, or user commands 450, as determined by the portion of the first GUI at which the user provides input.

Target pixel coordinates 500, are converted by the screen coordinate to orientation vector converter 510 into a desired orientation 520, preferably expressed as roll and pitch. The desired orientation adjusts the roll, pitch or both of the UAV 20, which is in the body frame 190 (FIG. 3). A desired yaw 525 is included in the flight control commands 540, generated from user commands 450 by touching the video panel or using the targeting icon button 1120 in map mode, or the manual yaw control icon 1420 in the indoor mode. This information is then sent through the network interface 340. User commands 450 may be converted by a command processor 530 into flight control commands 540. Each of the flight control commands 540 and the desired orientation 520 are sent to the UAV 20 over the communication network 30 (FIG. 1) via the network interface 340.

Figure 7:
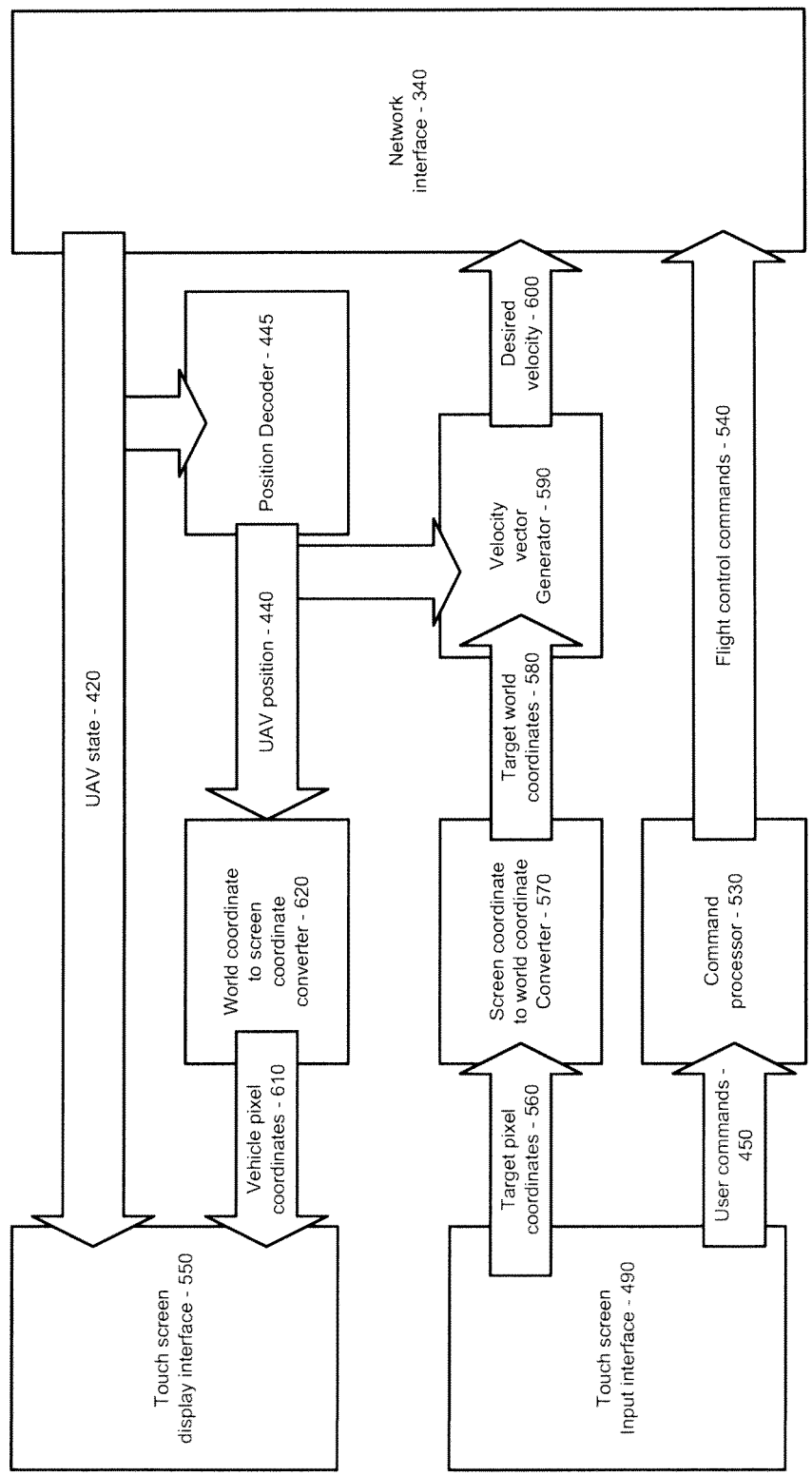
FIG. 7 is a schematic of map interface logic for both a touch-screen display interface and the touch-screen input interface when directing flight of the UAV through velocity vectors.

FIG. 7 is a schematic of map interface logic for both a touch-screen display interface 550 and the touch-screen input interface 490 when directing flight of the UAV 20 through velocity vectors. Target pixel coordinates 560 may be received through user input on the map 60 portion of the first GUI (FIG. 2) displayed on the touch-screen input interface 490. The target pixel coordinates 560 are processed by the screen coordinate to world coordinate converter 570 to generate target world coordinates 580. The target world coordinates 580 and the UAV position 440 are the inputs required for the velocity vector generator 590, which may generate a desired velocity vector 600, preferably expressed as latitude velocity and longitude velocity. The position control of the UAV 20 position is independent of its yaw (heading), as the rotary winged aerial vehicle may hover and move in any direction. In addition to target pixel coordinates 560, user commands 450 may also be received through the touch screen input interface 490 and may be converted by the command processor 530 into flight control commands 540. Each of the desired velocity vector 600 and the flight control commands 540 may be sent to the UAV 20 over the communication network 30 (FIG. 1) via the network interface 340.

Target pixel coordinates 500 (FIG. 6) differ from target pixel coordinates 560 in that the target pixel coordinates 500 are converted to a desired orientation 520 (FIG. 6) that the UAV 20 should achieve, while target pixel coordinate 560 are converted to target world coordinates 580.

The UAV state 420 is received from the UAV 20 over the communication network 30 (FIG. 1) via the network interface 340. The UAV position 440 is determined from the UAV state 420 by a position decoder 445. The UAV state 420 is used to determine the orientation of the UAV 20. The UAV position 440 is converted to UAV pixel coordinates 610 by a world coordinate to screen coordinate converter 620. The UAV position 440 and the UAV pixel coordinates 610 may respectively determine the location and orientation of the UAV icon 110 on the map 60 of the first GUI (FIG. 2), which is displayed on the touch-screen display interface 550.

Navigation and Payload Processor

FIG. 8 is a schematic of high-level functional blocks of software components executing on the navigation and payload processor 220, and flow of data between the software components, and between the software components and associated hardware. The UAV state 420 is received from the vehicle control unit processor 210 (FIG. 4) via the CLI 290. A data logger 630 records the UAV state 420 in a data storage 640, preferably persistent data storage. This record of the UAV state 420 may be sent through the onboard network interface 425, preferably through the onboard WiFi™ adaptor 240. Similarly, data from a payload interface 660, which may include still photo, video, sound, enhanced imagery such as infrared or night vision, or other data, may be stored in data storage 640 and may be sent through the onboard network interface 425, preferably through the onboard WiFi™ adaptor 240. The UAV state 420 and data from the payload interface 660 may also be sent through the onboard network interface 425, preferably through the onboard wireless modem 250, without first being stored in the data storage 640.

Navigation commands 410 may be received by the navigation and payload processor 220 through the onboard network interface 425 (FIG. 5). Navigation commands 410, preferably desired velocity 600, desired orientation 520, desired height 690, and desired yaw 525 may be sent to the vehicle control unit processor 210 (FIG. 4) via the CLI 290 without being processed by the navigation and payload processor 220. Desired height 690 is preferably expressed as distance above ground level. Navigation commands 410, preferably flight control commands 540, are sent to a navigator 650. The navigator 650 processes flight control commands 540 relating to waypoint navigation into a desired position 680, preferably expressed as latitude, longitude, and heading. The desired position 680 is sent to the vehicle control unit processor 210 (FIG. 4) via the CLI 290.

Vehicle Control Unit Processor

Figure 9:
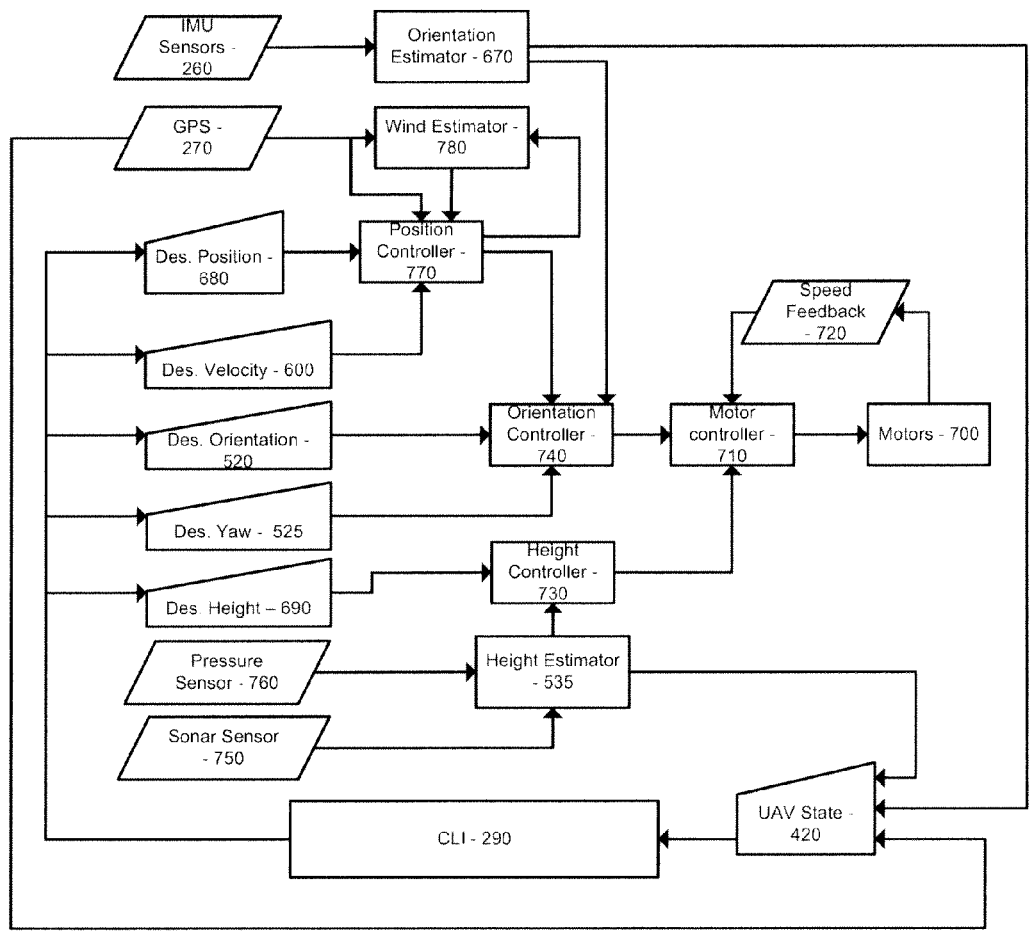
FIG. 9 is a schematic of high-level functional blocks of software components executing on a vehicle control unit processor, and flow of data between the software components, and between the software components and associated hardware.

FIG. 9 is a schematic of high-level functional blocks of software components executing on a vehicle control unit processor 210, and flow of data between the software components, and between the software components and associated hardware.

The IMU sensors 260 may provide data to an orientation estimator 670, which preferably estimates the roll, pitch, and yaw of the UAV 20 to provide an estimated orientation 790 (FIG. 10) of the UAV 20. Output data from the orientation estimator 670, the onboard GPS receiver 270, and a height estimator 535, may be combined as the UAV state 420 and sent to the navigation and payload processor 220 (FIG. 4) via the CLI 290. The onboard GPS receiver 270 preferably provide the UAV position 440 and the speed of the UAV 20. The height estimator preferably provides an estimated height 950 (FIG. 12) of the UAV 20 above the ground, based on input from a sonar sensor 750 and a pressure sensor 760. The pressure sensor 760 may measure absolute air pressure, while the sonar sensor 750 may detect the ground using conventional sonar. The sonar sensor 750 may operate for low-altitude flight (below approximately six meters), and may often be used for takeoff and landing.

The desired position 680, desired velocity vector 600, desired orientation 520, and desired height 690 may be received from the payload processor 220 (FIG. 4) via the CLI 290. Each of these inputs may be processed by the vehicle control unit processor 210 to direct motors 700 of the UAV 20. There are preferably four motors 700 on the UAV 20, each preferably connected to a rotor.

A position controller 770 may determine the required orientation of the UAV 20. To make this determination, the position controller 770 may require the UAV position 440 (FIG. 11), the speed of the UAV 20, a current wind speed and direction 900 (FIG. 11), and either the desired position 680 or desired velocity vector 600. The UAV position 440 and the speed of the UAV 20 may be provided by the onboard GPS receiver 270. The wind estimator 780, may estimate current wind speed and direction 900 by comparing a model-based prediction of the air-speed velocity to the ground velocity of the UAV 20 measured by the onboard GPS receiver 270. The required orientation of the UAV 20 may then be sent to an orientation controller 740. Alternatively, the desired orientation 520 may be sent directly to the orientation controller 740 from the navigation and payload processor 220 (FIG. 4) via the CLI 290.

The orientation controller 740 may determine desired differential control thrusts 930 (FIG. 11) of the motors 700. To make this determination, the orientation controller may require an estimated orientation 790 (FIG. 10) of the UAV 20, and either the desired orientation 520 or the required orientation of the UAV 20 as provided by the position controller 770, or the desired yaw 525. The desired differential control thrusts 930 (FIG. 11) are sent to a motor controller 710.

A height controller 730 may determine the required vertical thrust of the motors 700. To make this determination, the height controller 730 may require the desired height 690, the estimated height 950 (FIG. 12), and the current and desired vertical velocities of the UAV 20.

The motors 700 may be controlled by the motor controller 710. The motor controller 710 may compute the motor speeds required to achieve the desired thrusts and maintains the motor speeds by comparing the required speeds to the measured speeds of the motors. The speed of the motors 700 may be measured by hall-effect sensors, voltage or current feedback of multi-phase electric motors, or other rotational speed measurement systems. A speed feedback 720 may include the measured speeds of the motors 700. The motor controller 710 performs its computation based input from the speed feedback 720, the desired thrust from the height controller 730, and the desired rotational torques from the orientation controller 740.

Figure 10:
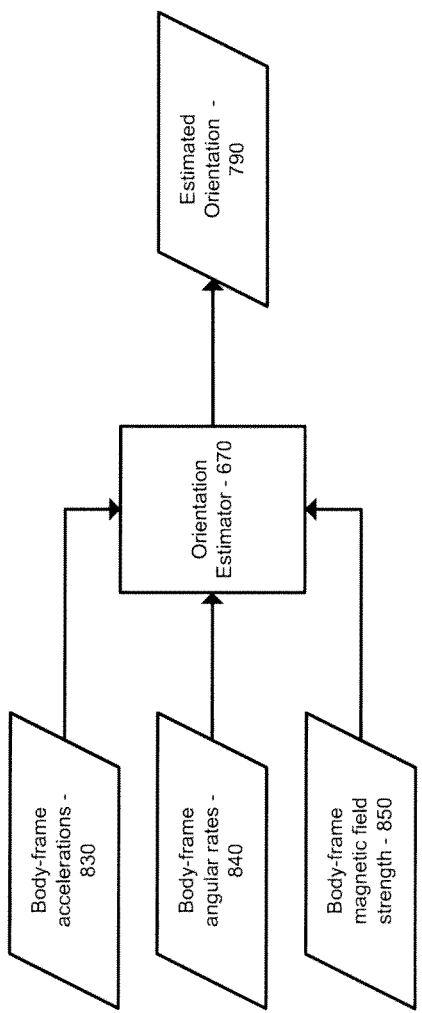
FIG. 10 is a flow chart of high-level functional blocks of software components executing on a UAV orientation estimator.

FIG. 10 is a flow chart of high-level functional blocks of software components executing on the UAV orientation estimator 670. The orientation estimator 670 may use a Kalman Filter to update and correct the estimated orientation 790 by fusing body-frame accelerations 830, body-frame angular rates 840, and body-frame magnetic field strength 850. The body-frame accelerations 830, body-frame angular rates 840, and body-frame magnetic field strength 850 may be measured by IMU sensors 260 (FIG. 9).

Figure 11:
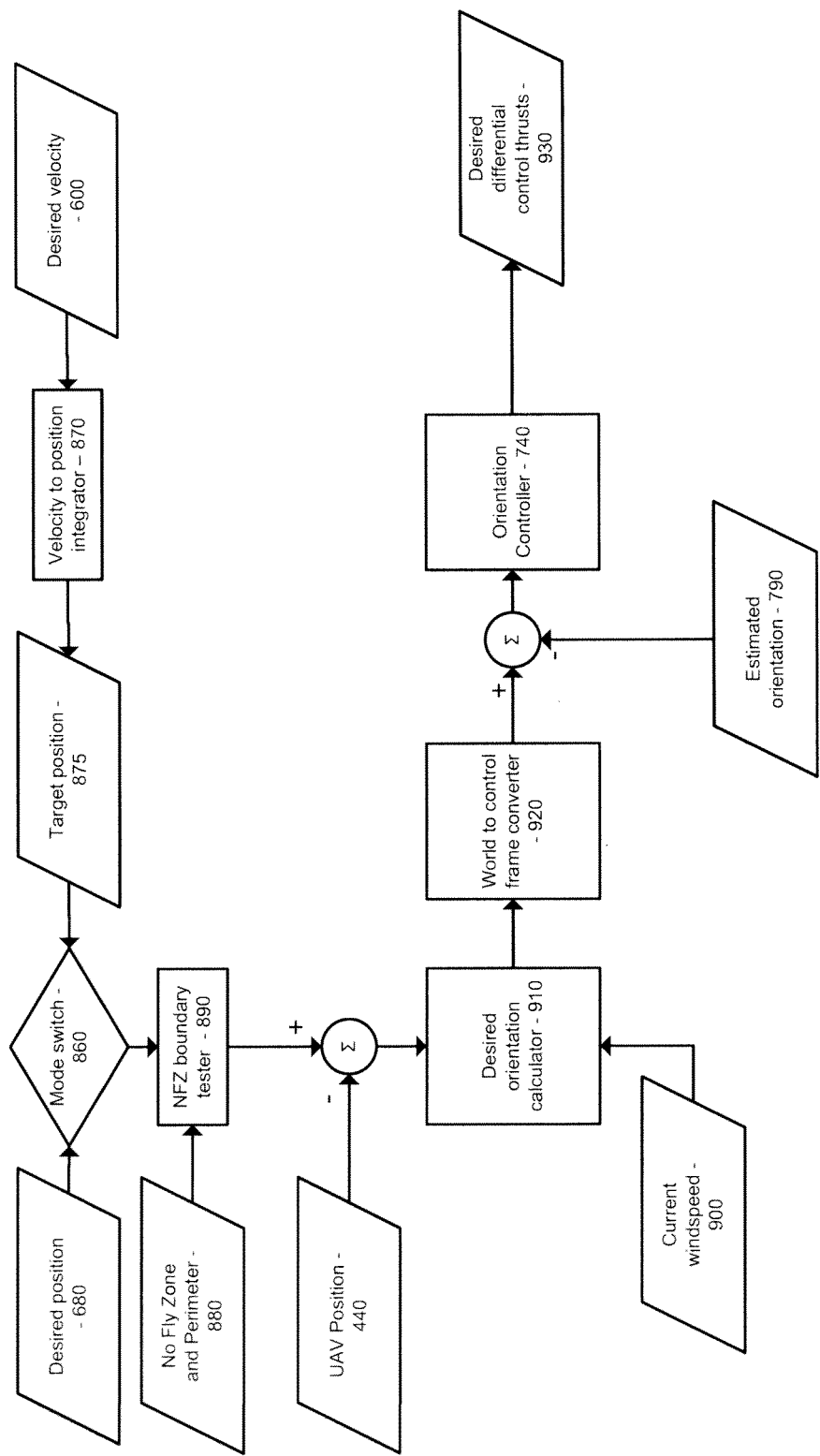
FIG. 11 is a flow chart of high-level functional blocks of software components executing on a UAV position controller and orientation controller.

FIG. 11 is a flow chart of high-level functional blocks of software components executing on the UAV position controller 770 and orientation controller 740. A mode switch 860 may allow input in the form of either a desired position 680 or a desired velocity vector 600. The desired position 680 input is sent to a NFZ boundary tester 890. A velocity to position integrator 870 may transform the desired velocity vector 600 into the target position 875, and the target position 875 may be sent to the NFZ boundary tester 890. The NFZ boundary tester 890 combines NFZ and perimeter data 880 with either the desired position 680 or the target position 875 to determine whether any further movement of the UAV 20 toward the desired position 680 or target position 875 will cause the UAV 20 to enter a NFZ 160 or leave a perimeter 170 (FIG. 2). The result produced by the NFZ boundary tester 890 may be summed with the UAV position 440, then sent to a desired orientation calculator 910. The desired orientation calculator 910 may combine the sum of the NFZ boundary tester 890 and UAV position 440 input with the current wind speed and direction 900.

The desired orientation calculator 910 may send its output to a the world to control frame converter 920, which converts the required UAV 20 orientation into the control coordinate frame 200 orientation by rotating the input orientation about the Z axis of the UAV 20. The result of the conversion from global frame 180 into body frame 190 is combined with the estimated orientation 790 and the result is inputted to the orientation controller 740, which uses a feedback control loop to compute desired differential control thrusts 930. The desired differential control thrusts 930 may either maintain a course that directs the UAV 20 towards either the desired position 680 or target position 875. Alternatively, if any further movement by the UAV 20 toward the desired position 680 or target position 875 will cause the UAV 20 to enter a NFZ 160 or leave a perimeter 170 (FIG. 2), the UAV 20 may cease moving toward the desired position 680 or target position 875 and the desired orientation calculator 910 will automatically calculate an orientation that will cause the UAV 20 to maintain its current position.

Figure 12:
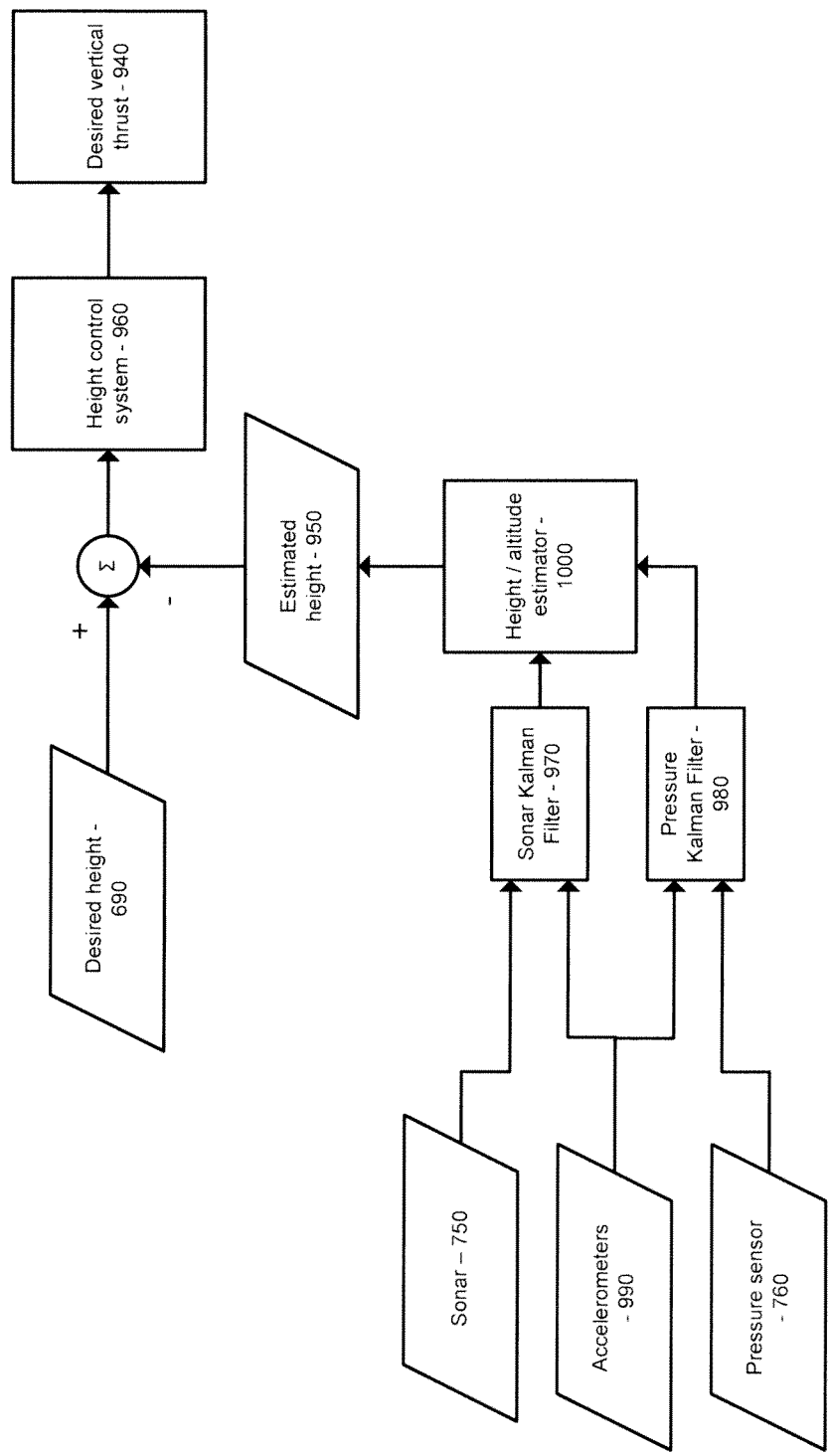
FIG. 12 is a schematic of high-level functional blocks of software components executing on a UAV height controller, and flow of data between the software components, and between the software components and associated hardware.

FIG. 12 is a schematic of high-level functional blocks of software components executing on the UAV height controller 730, and flow of data between the software components, and between the software components and associated hardware. The estimated height 950 of the UAV 20 may be determined by applying an algorithm which combines data from a sonar Kalman filter 970 and a pressure Kalman filter 980. The sonar Kalman filter 970 may fuse data from a sonar sensor 750, which provides a direct observation of height above ground with a maximum range of approximately 6 meters, and from accelerometers 990. The pressure Kalman filter 980 may fuse data from a pressure sensor 760, which estimates altitude of the UAV 20 based on air pressure, and from the accelerometers 990. The output from the sonar Kalman filter 970 and the pressure Kalman filter 980 may be used by the height and altitude estimator 1000 to produce the estimated height 950. The sum of the estimated height 950 and desired height 690 of the UAV 20 are sent to a height control system 960, which determines the desired vertical thrust 940 to achieve the desired height 690.

Figure 13:
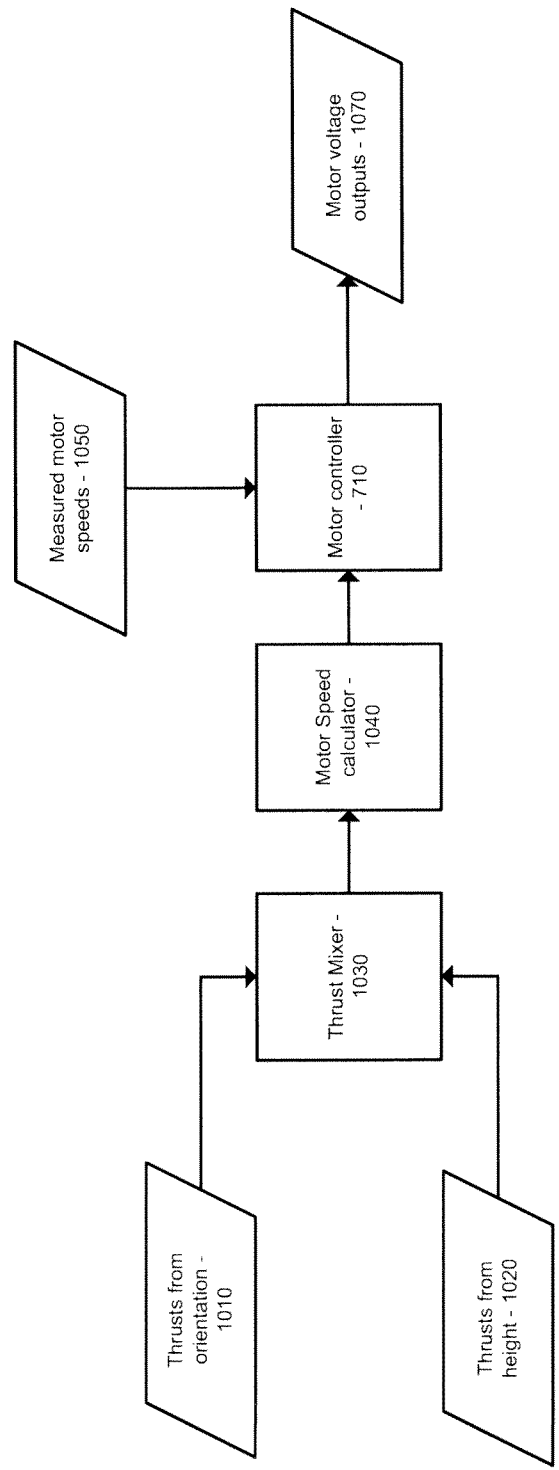
FIG. 13 is a flow chart of high-level functional blocks of software components executing on a UAV motor speed controller.

FIG. 13 is a flow chart of high-level functional blocks of software components executing on a UAV motor speed controller 710. The UAV motor speed controller 710 calculates the speed of each motor 700 based on the required vertical thrust computed by the height controller 730, and the differential thrusts computed by the orientation controller 740. Thrusts from orientation 1010 are required to (FIG. 9). Thrusts from height 1020 are required to achieve the desired height 690 (FIG. 9). The thrusts from orientation 1010 and the thrusts from height 1020 are sent to a thrust mixer 1030. The thrust mixer 1030 determines a set of thrusts that will achieve the desired orientation 520 or the required orientation as determined by the position controller 770, and the desired height 690 (FIG. 9), and which are within user-defined safe operating parameters. A motor speed calculator 1040 may map desired thrusts to corresponding motor speeds. The result obtained by the motor speed calculator 1040 may be combined with measured motor speeds 1050 and the result may be inputted to motor speed controller 710, which may be a control system used to maintain desired motor speeds based on the differential between desired and measured speeds, and the motor voltage outputs 1070 may be generated.

Graphical User Interface (GUI)

Figure 14:
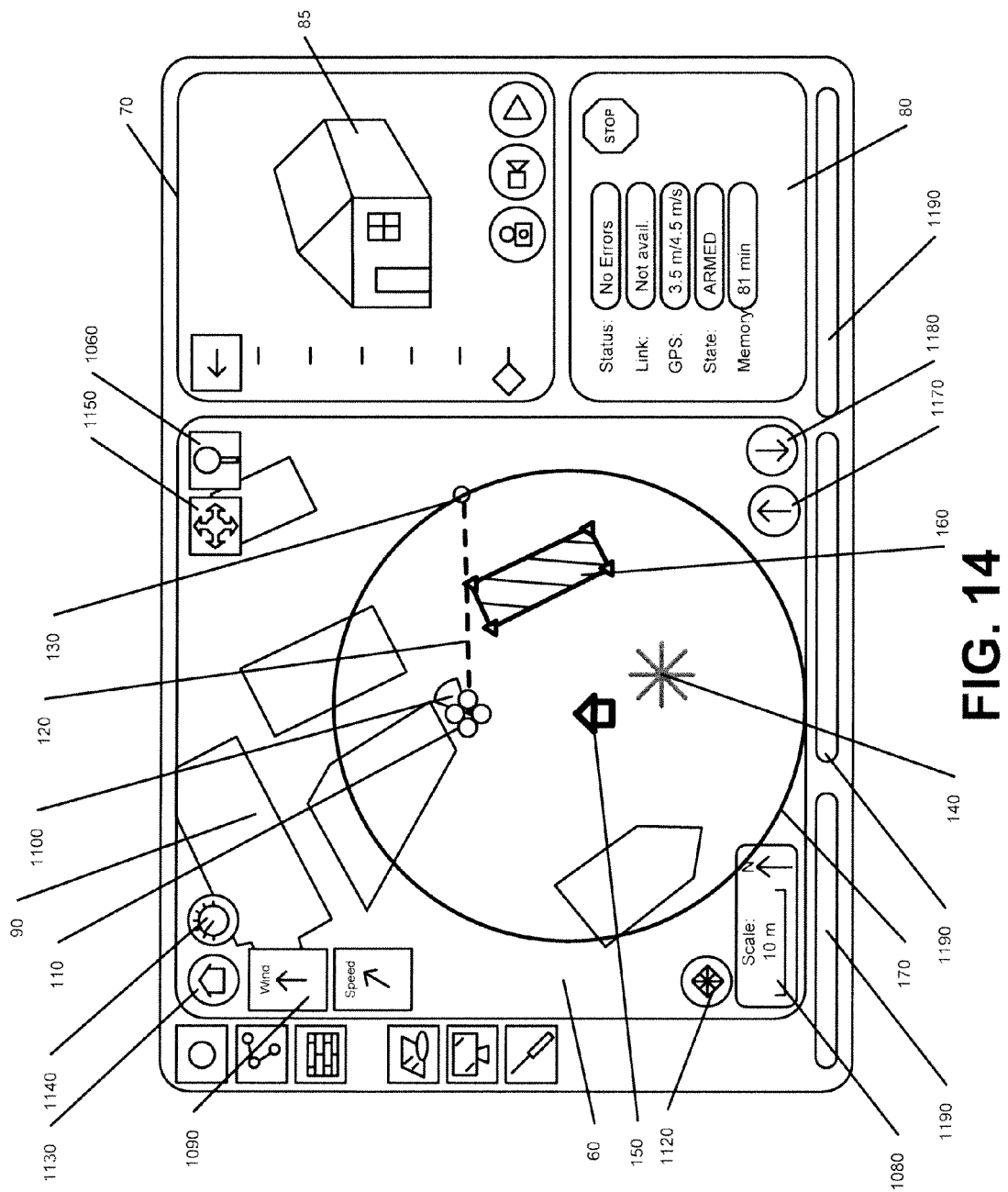
FIG. 14 is a screenshot from the first GUI in a "press and hold" velocity input mode.

FIG. 14 is a screenshot from a first GUI in a "press and hold" velocity input mode. The first GUI is divided into three broad sections: the map 60, the payload window 70, and the UAV status window 80. The payload window 70 displays information obtained from the sensory payload, for example video feed 85 from the camera 230 (FIG. 4). The UAV status window 80 displays information regarding status of various aspects of the UAV 20, such as the status of network links, estimated accuracy of a position estimate provided by a GPS, and the amount of available data storage 640 (FIG. 8).

The map 60 displays a representation of the environment in which the UAV 20 is operating. Information displayed on the map 60 includes a scale and compass 1080, wind estimation and ground speed (magnitude and direction) 1090 of the UAV 20, the UAV icon 110, a current field of view 1100 of the camera 230, and the straight-line path 120 between the current position UAV 20 as indicated by the UAV icon 110 and the target position 875 as indicated by the target position icon 130. The target position 875 is determined by the desired velocity vector 600 (FIG. 11). To create the desired velocity vector 600, the user provides and maintains input through the touch-screen interface 360 at any point on the map 60. The UAV 20 may begin to travel toward the target position 875 determined by the desired velocity vector 600. The UAV 20 may reduce speed as it approaches the target position 875, but will preferably continue to travel toward the target position 875 until it reaches the target position 875. The UAV 20 will cease travelling toward the target position 875 if the user ceases to provide input defining the desired velocity vector 600, or if the UAV 20 reaches the boundary of a NFZ 160 or perimeter 170. If the UAV 20 ceases to travel toward the target position 875, it may automatically adjust its desired differential control thrusts 930 (FIG. 11), desired vertical thrust 940 (FIG. 12), and motor voltage outputs 1070 (FIG. 13).

Figure 19:
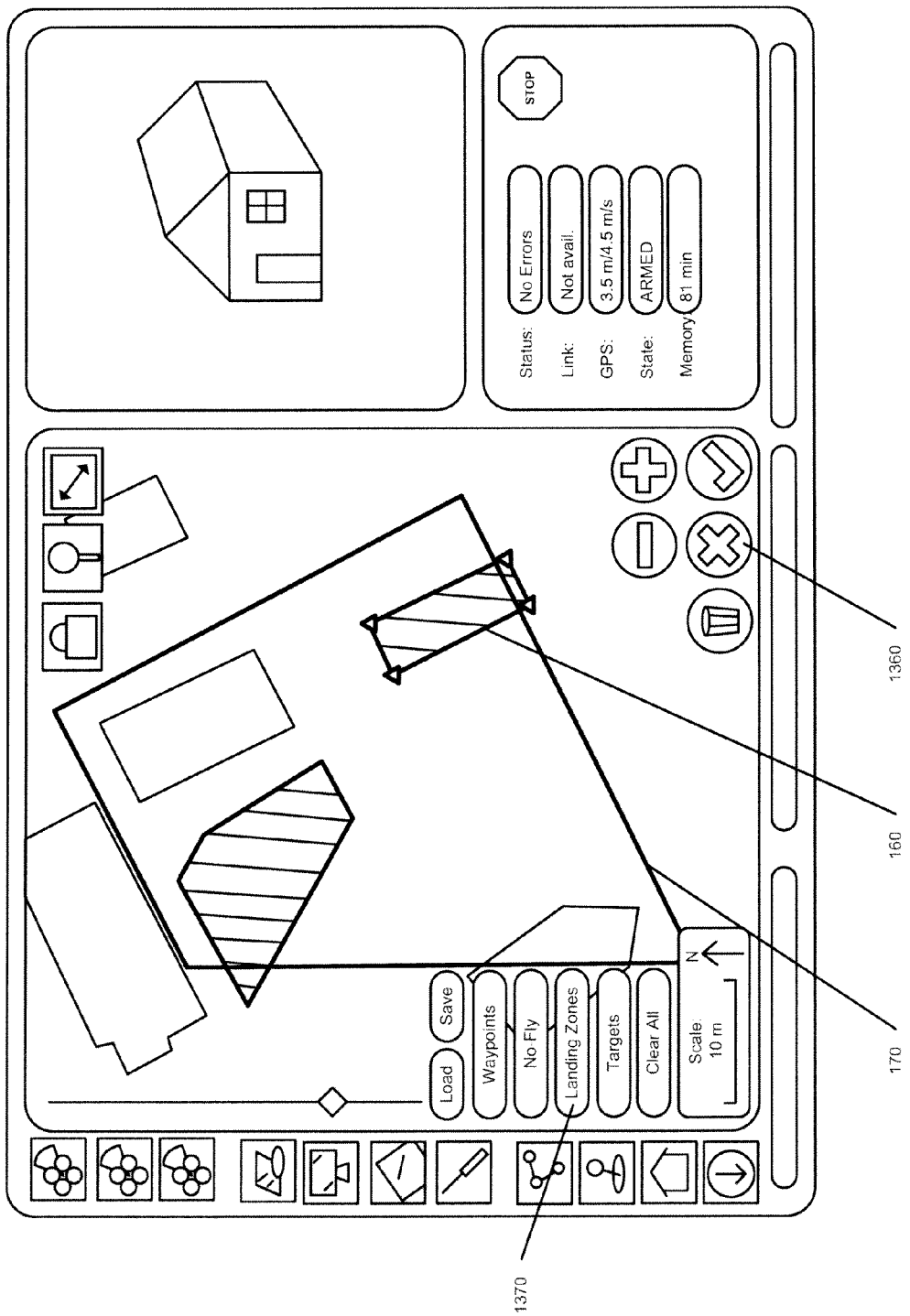
FIG. 19 is a screenshot from the second GUI in a "mission edit" mode.

This method of control allows the user to control the UAV 20 from an aerial reference frame as opposed to from the perspective of the UAV 20. This method of control further allows the user to control the UAV 20 by providing a small number of high-level commands, rather than constantly providing inputs to the UAV 20. In addition, if the UAV 20 is operating autonomously, inputs to the map 60 through the touch-screen interface 360 will not be directly passed to the UAV 20, but may instead be integrated with the predefined mission profile in the form of a waypoint 1470 (FIG. 19). Other commands such as ordering a UAV 20 to remain at its current position or activating sensor payloads can be made by providing user input through the touch-screen interface 360 at the mode icons 1220 (FIG. 15) to create the corresponding flight commands 540.

Flight commands 540, navigation commands 410, and other user commands 450 may be executed by providing user input through the touch-screen interface 360 at icons located on the map 60. Input at a sensor icon 1120 may create targets 140 on the map 60 towards which the camera 230 (FIG. 4) will pan if the target is selected. Input at a home icon 1130 may direct the UAV 20 to a pre-determined home location 150 on the map 60. Input at a speed icon 1140 may toggle the UAV 20 between "high speed" and "low speed" modes, which impose different user-defined limits on the speed of the UAV 20. Input at a pan icon 1150 may switches the map 60 into "pan" mode, which may allow the map to be dragged to view portions not centered on the UAV icon 110. Input at a center icon 1060 may center the map 60 on the UAV 20. Input at a takeoff icon 1170 may direct the UAV 20 to take off. Input at a land icon 1180 may directs the UAV 20 to land at its current position. The altitude slider 1012 displays and allows user control of the UAV 20's altitude. Status changes of the UAV 20, such as motors starting, lifting off the ground, starting and stopping horizontal translation, and landing; and errors, such as sensor failures, wind estimates exceeding specified limits, and low battery conditions are indicated at the information bar 1190.

Figure 15:
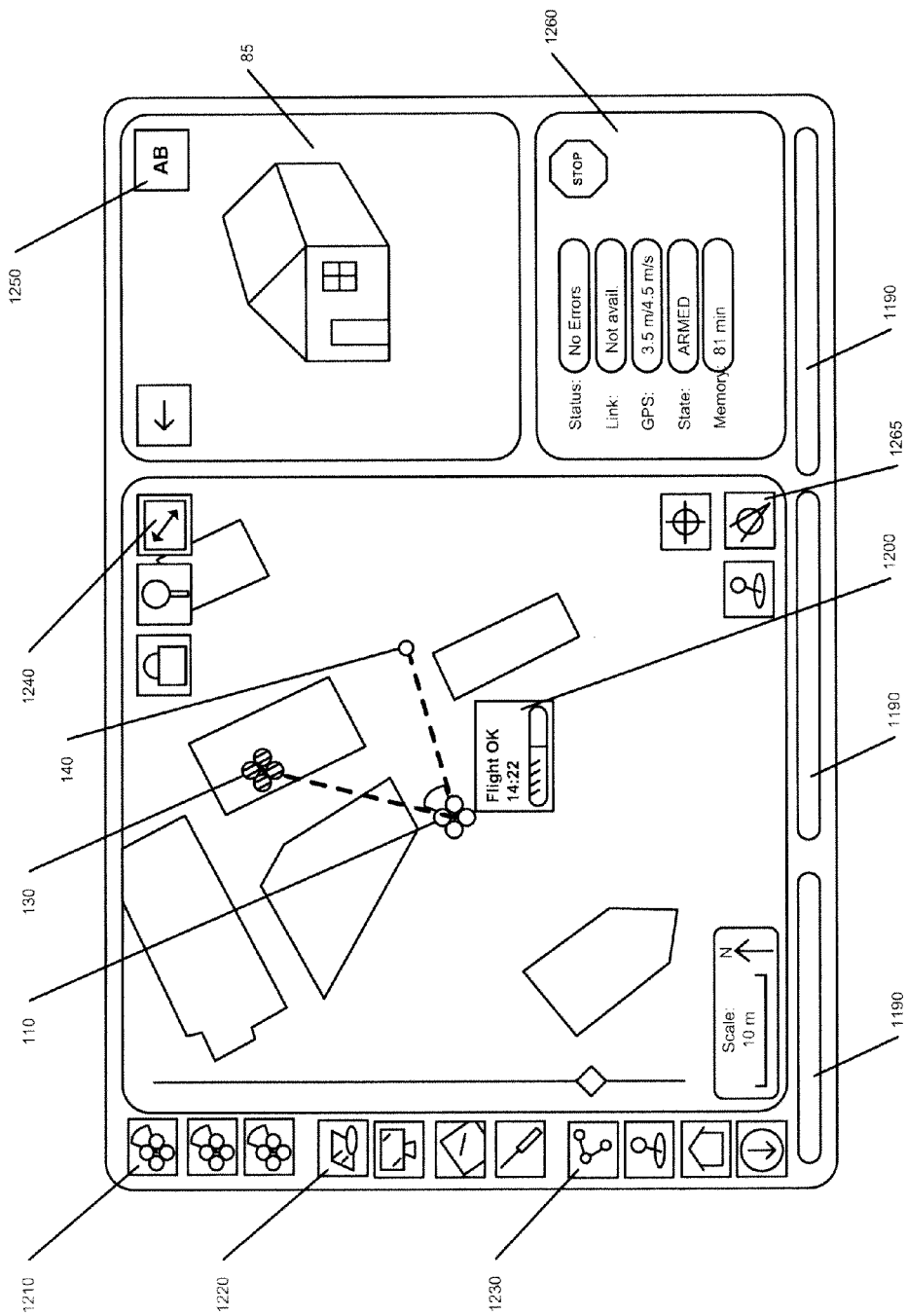
FIG. 15 is a screenshot from a second GUI that may be used to implement the method in a "press and hold" velocity input mode.

FIG. 15 is a screenshot from a second GUI that may be used to implement the method in a "press and hold" velocity input mode. Important information relevant to the UAV 20 may be displayed in a floating panel 1200. The floating panel 1200 may be proximate to the UAV icon 110, allowing the user to determine the overall status of the UAV 20 at a glance and associate it with the location of the UAV 20. Together, the UAV icon 110, the target position icon 130, the target 140, and the floating panel 1200 produce a terse recitation of relevant information pertaining to the system's capabilities across the operational area.

UAV choice icons 1210, mode icons 1220, and control icons 1230 are all used to provide input to the touch-screen interface 360 to create flight commands 540, navigation commands 410, and other user commands 450. The user provides input through the UAV choice icons 1210 to chooses which UAV 20 to command from among a plurality of UAVs 20 (not shown). The UAV choice icons 1210 may change color to provide a convenient high-level indication of a the state of a given UAV. The user may provide input through the icons mode icons 1220 to work within one of five system operation modes: "operation", "mission edit", "mission review", "UAV configuration", and "UAV log". The user may provide input through the control icons 1230 to control the UAV 20 in one of four UAV control modes: "fully autonomous", "manually controlled", "emergency landing", and "base-return". Inputting any of these user commands 450 is simple and convenient requiring only one touch on the relevant portion of the touch-screen interface 360. This may allow the user to control any given UAV 20 through any of the UAV control modes with only two actions. The first action is to choose which UAV 20 to control by inputting at one of the UAV choice icons 1210, and then to choose the control mode to apply to that UAV 20 by inputting one of the control icons 1230 to create the relevant user command 450.

The second GUI may consistently include an information bar 1190. The other visible items may change depending on the current task, possibly including a top-down map 60 and map control icons 1240, the video feed 85 and video feed control icons 1250, and UAV status window 1260 (which differs from UAV status window 80). Map control icons 1240 are analogous to the pan icon 1150 and center icon 1060. An alternative embodiment of the invention may display the map 60 and map controls icons 1240, the video feed 85 and control icons 1250, and the UAV status window 1260 across different displays, either physical, for example an external display 50 or virtual. The icons 1265 are control-mode specific.

Figure 16:
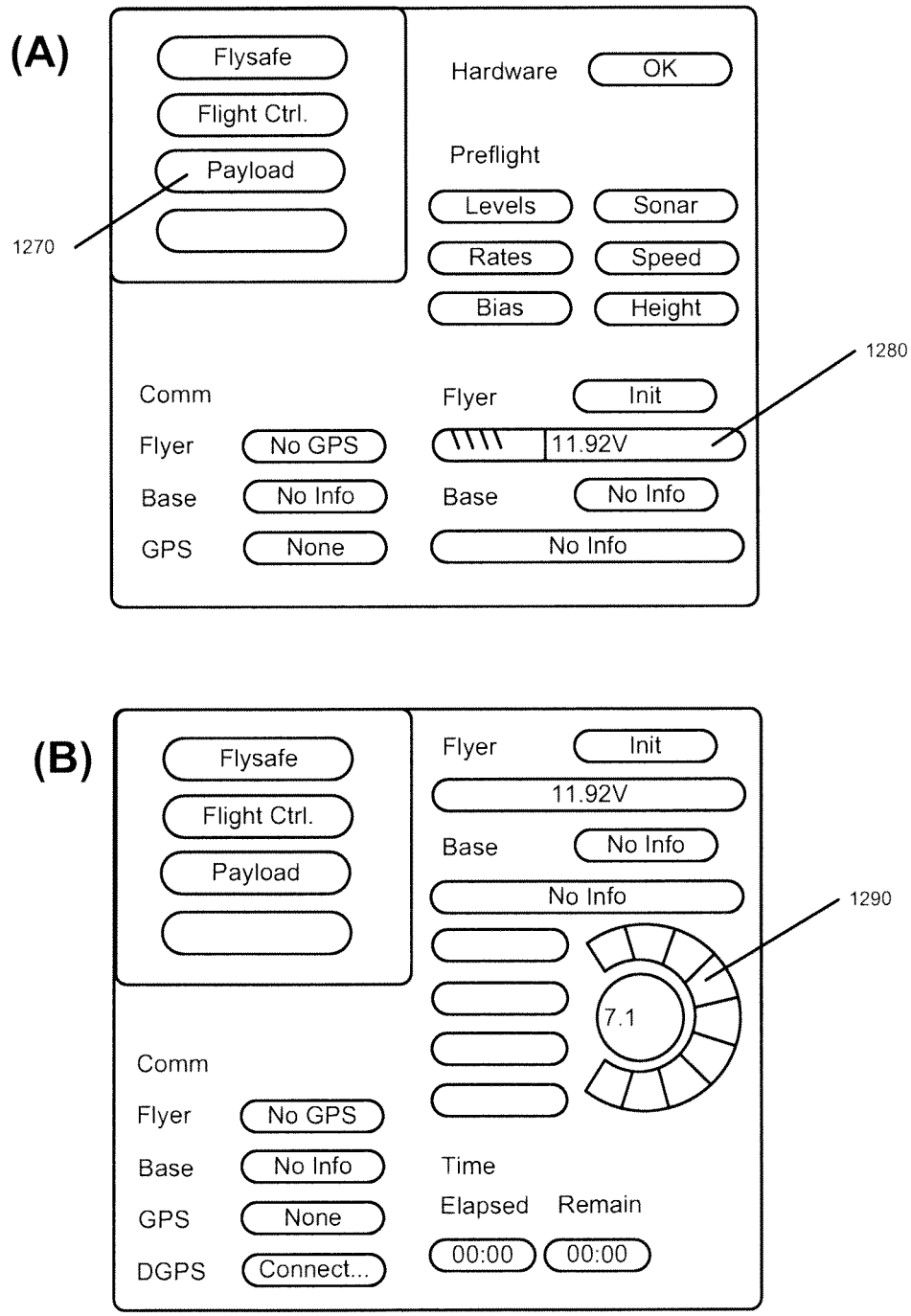
FIGS. 16(a) and 16(b) are screenshots from the second GUI illustrating changes in display that occur upon changing a control mode of the UAV.

FIGS. 16(a) and 16(b) are screenshots from the second GUI illustrating changes in display that may occur upon changing the control mode of the UAV 20. FIGS. 16 (a) and 16 (b) represent alternative configurations of the UAV status window 1260. As the UAV 20 proceeds through a mission, users may require different information, and this status information is partially determined by the control mode being applied to a UAV 20, as chosen by the user through inputting one of the control icons 1230.

Changing between the respective configurations of the UAV status window 1260 shown in FIGS. 16 (a) and 16 (b) occurs automatically based on events such as user input through the control icons 1230 to choose a different UAV control mode. The user may also change the UAV status window 1260 without changing the UAV control mode by inputting on the touch-screen display 360 at one of the status display choice icons 1270 to create the relevant user command 450. Some features are present on all configurations of the UAV status window 1260, such as battery status display 1280, while others are only present when the UAV is in a specific UAV control mode, such as UAV altitude display 1290.

Figure 17:
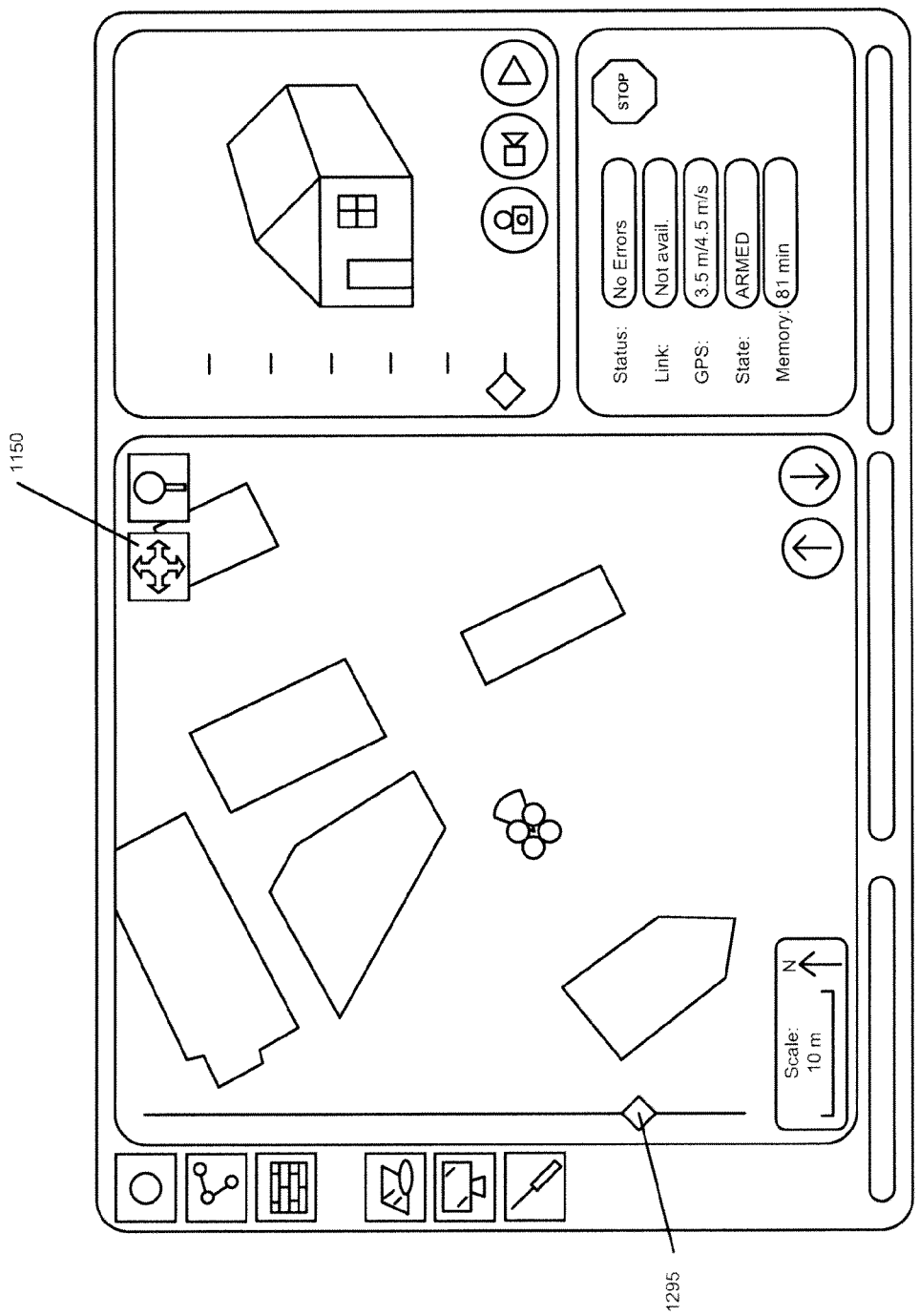
FIG. 17 is a screenshot from the first GUI in a "map-panning mode"

FIG. 17 is a screenshot from the first GUI in a "map-panning mode", which allows the user to pan the map 60. This separates the UAV icon 110 from the center of the map 60. The zoom level of the map 60 may be adjusted through slide bar 1295.

Figure 18:
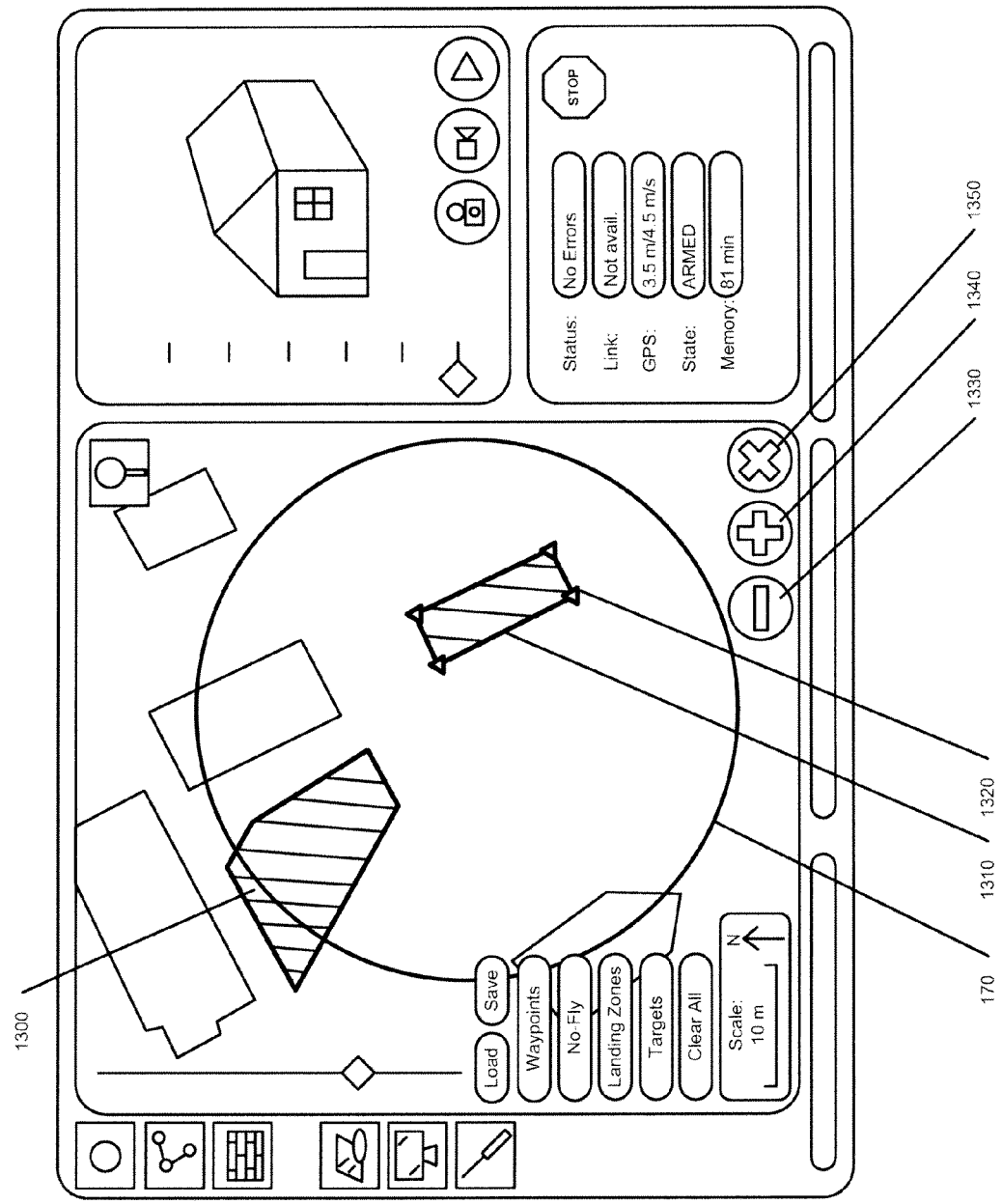
FIG. 18 is a screenshot from the first GUI in a "mission edit" mode.

FIG. 18 is a screenshot from the first GUI in a "mission edit" mode. In the "mission edit" mode, flight parameters may be adjusted. Flight parameters may include a perimeter 170 or a NFZ 160 (a first NFZ 1300 and a second NFZ 1310 are illustrated). The perimeter 170 is the area within which the UAV 20 may travel. The first NFZ 1300 is the area defined by four example of an NFZ point 1320. The second NFZ 1310 is partially outside the perimeter 170. NFZs are created through use of a point deletion icon 1330, a point addition icon 1340, and a NFZ deletion icon 1350. The point deletion icon 1330 deletes the currently selected NFZ point from an NFZ. The point addition icon 1340 adds a new NFZ point 1320 and allows the user to edit an NFZ. The NFZ deletion icon 1350 removes the current NFZ completely. While the first NFZ 1300 and second NFZ 1310 are both quadrahedral, NFZs with any number of points greater than two may be created.

FIG. 19 is a screenshot from the second GUI in a "mission edit" mode. The NFZ icons 1360, which are control-mode specific, are analogous to the point deletion icon 1330, point addition icon 1340, and NFZ deletion icon 1350 (FIG. 18). The user may provide input through the mission edit icons 1370 to change the current feature being edited, or save and load missions. Features such as target position icons 130 and targets 140 may be removed from the GUI display to reduce clutter. A NFZ 160 is currently being edited, and other objects, for example the perimeter 170, are rendered partially transparent to provide immediate visual indication of which features are being edited. The perimeter 170 in this instance is polygonal, in contrast to the perimeters 170 in FIGS. 2 and 18, which are circular.

Figure 20:
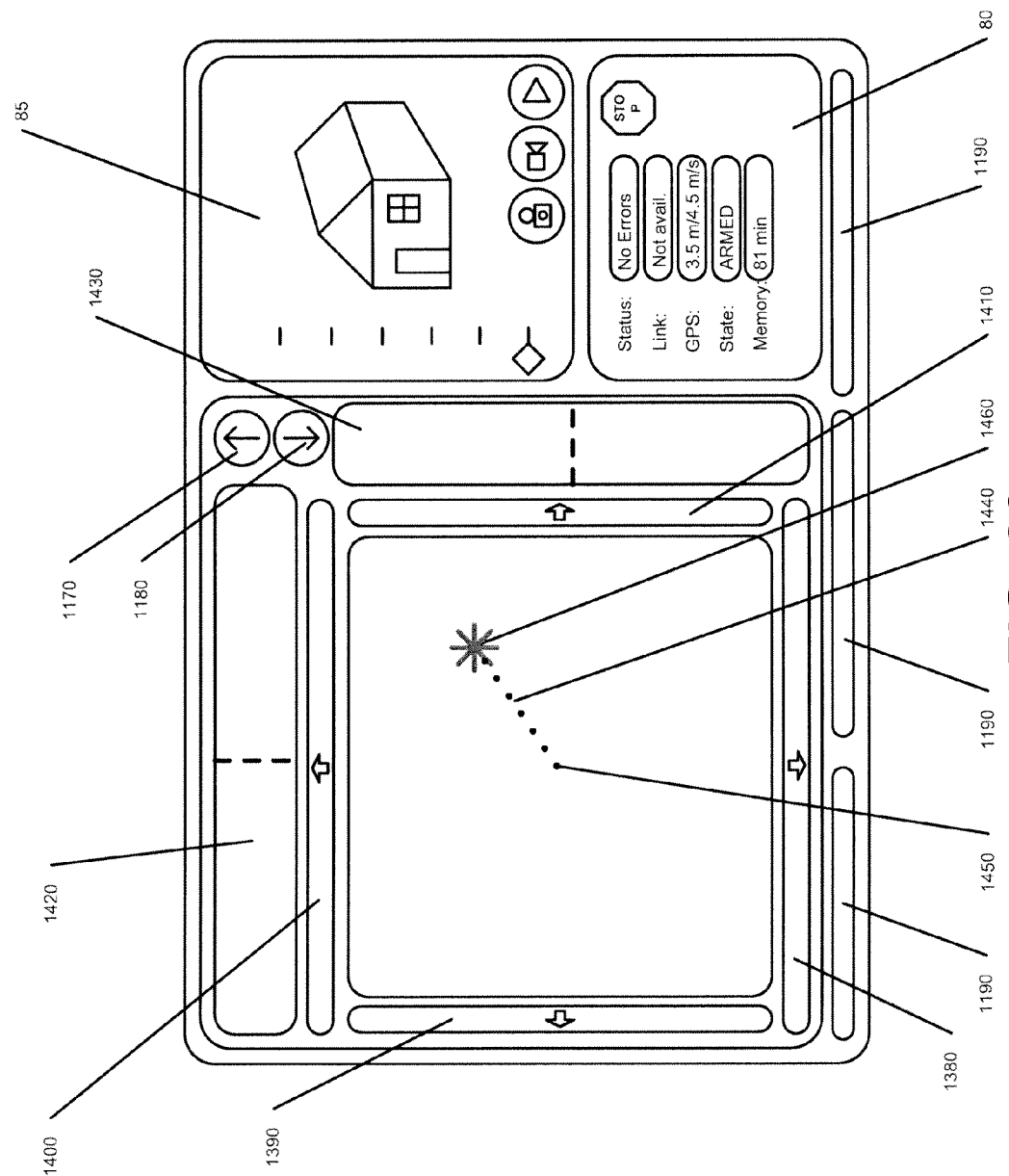
FIG. 20 is a screenshot from the first GUI being used to control the UAV's orientation directly.

FIG. 20 is a screenshot from the first GUI being used to control the orientation of the UAV 20 directly through input of a desired orientation 520 (FIG. 6). While operating the UAV 20 in this manner, input to the onboard GPS receiver 270 may be unnecessary. The following icons are available on the GUI and cause the corresponding persistent changes in orientation of the UAV 20: trim UAV pitch (negative) icon 1380, trim UAV roll (negative) icon 1390, trim UAV roll (positive) icon 1400, trim UAV pitch (positive) icon 1410, manual UAV yaw control icon 1420, manual UAV height control icon 1430, land icon 1180, takeoff icon 1170, and user desired graphical velocity vector in the body frame (up equals forward) 1440. A graphical velocity vector 1440 is shown with an origin 1450 and a head 1460.

The simple and intuitive nature of the "press and hold" velocity input control method is further enhanced by the consistent behaviour and appearance of the first GUI and second GUI across the various possible tasks. The UAV choice icons 1210, mode icons 1220, and control icons 1230, and the view commands 1240 remain constant regardless of the control mode being used. The control mode-specific map commands icons 1265 and 1360 differ as between the different UAV control modes, but are in the same location regardless of UAV control mode, and the map 60 incorporates common input methods through the touch-screen interface 360, such as dragging to pan/move and tapping to select/add. The familiarity of users with the concept of dragging to pan, the same input to the portion of the payload window 70 displaying video feed 85 will pan the camera 230 accordingly.

This method of input is also extended to the manual control of the UAV 20. While the UAV is being controlled in this fashion, navigation commands 410 can be created by inputting at the map 60 to input a desired velocity 600 or by inputting at the portion of the payload window 70 displaying video feed 85 to input a desired orientation 520. When dragging in the portion of the payload window 70 displaying video feed 85, the inputs should be transformed according to the orientation of the camera 230. Manual control of the UAV 20 is more suitable for fine control of the selected UAV 20 than is creating a navigation command 410 by inputting at a given target pixel coordinates 560 on the map 60 displayed on the touch-screen interface 360, but nonetheless maintains the method's intuitive and consistent input methods FIGS. 14-20 illustrate that this control method for a UAV 20 may allow a variety of possible tasks including review of mission data, configuration and review of UAV 20 performance, design and modification of missions, execution of missions, automated control of a UAV 20 through navigation to waypoints, semi-automated control of a UAV 20 by choosing a desired destination 680, manual control of a UAV 20, review of data from the camera 230, and control of the camera 230. Furthermore, this control method for a UAV 20 allows all of these tasks to be efficiently and intuitively undertaken with a hardware platform as limited as a touch-screen.

Peripherals may be to the control station 10. Peripherals may include an external display 50 or control device. One function of the external display 50 is to allow observation of sensor data from the payload of the UAV 20, or of the GUI, on the external display 50. Parties other than the user, and not in proximity to the user or to the UAV 20, may also exercise direct control over the UAV 20 via direct control through a second control station 10. This provides the opportunity for teamwork. For example output from the camera 230 may be controlled from a second control station 10 while the user, who may be physically closer to the UAV 20, concentrates on navigating and editing missions for the UAV 20. Potential control peripherals include off-the-shelf or custom input hardware such as gamepads, control stick, keyboards, trackballs, industrial steering devices, gesture recognition technology, speech recognition technology, or neural interfaces. No external displays 50 or control peripherals are required for the use of the system, but provide the possibility of increased operator efficiency at the cost of portability. When using a peripheral such as a gamepad or control stick, the flight of the UAV 20 may be controlled simultaneously with panning of the camera 230. A control peripheral such as a gamepad or control stick may be used to generate a desired velocity vector 600 or a desired orientation 520.

It will be understood that the systems and methods described herein may be embodied in a range of computing platforms, with the underlying hardware, operating system, and interface method varying. It should also be understood that various modifications can be made to the example embodiments described and illustrated herein, without departing from the general scope of the inventions and associated claims.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments herein can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments are intended to be examples only. Alterations, modifications and variations can be effected to the particular embodiments by those of skill in the art without departing from the scope of the invention, which is defined solely by the claims appended hereto.

What is claimed is:

1. A method of remotely controlling a hovering unmanned aerial vehicle within an environment, the method comprising:
   providing a control station in communication with the hovering unmanned aerial vehicle;
   displaying, on a touch-screen interface at the control station, a visual representation of the environment;
   receiving target pixel coordinates for the aerial vehicle on the touch-screen interface within the visual representation of the environment;
   converting the target pixel coordinates into physical coordinates that are target world coordinates for the hovering unmanned aerial vehicle within the environment;
   determining a desired vector to direct the hovering unmanned aerial vehicle based on the physical coordinates; and
   based on the determined desired vector, directing the hovering unmanned aerial vehicle along the desired vector;
   wherein the desired vector comprises a speed proportional to the distance between the hovering unmanned aerial vehicle and the target world coordinates.

2. The method of claim 1, further comprising selecting a maximum speed which the hovering unmanned aerial vehicle will not exceed.

3. The method of claim 1, further comprising directing the hovering unmanned aerial vehicle to take an action upon reaching the target world coordinates.

4. The method of claim 1, further comprising controlling one or more functions of one or more of the hovering unmanned aerial vehicles by multiple control stations.

5. The method of claim 1, wherein the user provides the target pixel coordinates by touching a target position icon on the visual representation of the environment.

6. The method of claim 1, further comprising defining a flight parameter within the environment.

7. The method of claim 6, wherein the flight parameter is selected from the group of a no-fly zone, a perimeter, a target, a home location, or a combination thereof.

8. The method of claim 6, wherein the flight parameter is polygonal in shape.

9. The method of claim 1, further comprising:
   providing a sensory payload on the hovering unmanned aerial vehicle; and
   transmitting data gathered by the sensory payload, directly or indirectly, to the control station.

10. The method of claim 9, further comprising controlling the sensory payload independently of the hovering unmanned aerial vehicle.

11. The method of claim 1, further comprising directing a plurality of hovering unmanned aerial vehicles from the control station.

12. The method of claim 1, further comprising receiving an indication of a desired yaw for the hovering unmanned aerial vehicle independently of the received target pixel coordinates.

13. The method of claim 1, wherein the desired vector is a velocity vector.

14. The method of claim 13, wherein directing the hovering unmanned aerial vehicle comprises directing the hovering unmanned aerial vehicle along the determined desired velocity vector.

15. The method of claim 13, further comprising recalculating the desired velocity vector as the hovering unmanned aerial vehicle travels towards the target world coordinates to reduce the speed of the hovering unmanned aerial vehicle as it approaches the target world coordinates.

16. The method of claim 13, further comprising automatically directing the hovering unmanned aerial vehicle to remain at a current position if to continue travelling along the desired velocity vector would otherwise result in either directing the hovering unmanned aerial vehicle into a no-fly zone or directing the hovering unmanned aerial vehicle outside a perimeter.

17. The method of claim 13, further comprising automatically directing the hovering unmanned aerial vehicle to remain at a current position prior to beginning to travel along the desired velocity vector if to travel along the desired velocity vector would at any point either direct the hovering unmanned aerial vehicle into a no-fly zone or direct the hovering unmanned aerial vehicle outside a perimeter.

18. A method of remotely controlling a hovering unmanned aerial vehicle within an environment, the method comprising:
   providing a control station in communication with the hovering unmanned aerial vehicle;
   displaying, on a touch-screen interface at the control station, a visual representation of the environment;
   receiving target pixel coordinates for the aerial vehicle on the touch-screen interface within the visual representation of the environment;
   converting the target pixel coordinates into physical coordinates for the hovering unmanned aerial vehicle within the environment;
   determining a desired vector to direct the hovering unmanned aerial vehicle based on the physical coordinates; and
   based on the determined desired vector, directing the hovering unmanned aerial vehicle along the desired vector;
   wherein the user provides the target pixel coordinates by touching a target position icon on the visual representation of the environment and the hovering unmanned aerial vehicle remains at a current position if the user ceases to touch the target position icon.

19. A method of remotely controlling a hovering unmanned aerial vehicle within an environment, the method comprising:
   providing a control station in communication with the hovering unmanned aerial vehicle;
   displaying, on a touch-screen interface at the control station, a visual representation of the environment;
   receiving target pixel coordinates for the aerial vehicle on the touch-screen interface within the visual representation of the environment;
   converting the target pixel coordinates into physical coordinates for the hovering unmanned aerial vehicle within the environment;
   determining a desired vector to direct the hovering unmanned aerial vehicle based on the physical coordinates;
   based on the determined desired vector, directing the hovering unmanned aerial vehicle along the desired vector;
   receiving an indication of a desired yaw for the hovering unmanned aerial vehicle; and
   changing the yaw of the hovering unmanned aerial vehicle independently of the determination of the desired vector.

20. A method of remotely controlling a hovering unmanned aerial vehicle within an environment, the method comprising:
   providing a control station in communication with the hovering unmanned aerial vehicle;
   displaying, on a touch-screen interface at the control station, a visual representation of the environment;
   receiving target pixel coordinates for the aerial vehicle on the touch-screen interface within the visual representation of the environment;
   converting the target pixel coordinates into physical coordinates for the hovering unmanned aerial vehicle within the environment;
   determining a desired vector to direct the hovering unmanned aerial vehicle based on the physical coordinates; and
   based on the determined desired vector, directing the hovering unmanned aerial vehicle along the desired vector;
   wherein the desired vector is an orientation vector.

21. The method of claim 20, wherein receiving the target pixel coordinates comprises receiving a continuous indication of target pixel coordinates.

22. The method of claim 21, wherein directing the hovering unmanned aerial vehicle comprises directing the hovering unmanned aerial vehicle until the continuous indication of target pixel coordinates is no longer being received.

23. The method of claim 20, wherein the orientation vector comprises roll, pitch, or both roll and pitch.

24. A system for remotely controlling a hovering unmanned aerial vehicle within a physical environment, the system comprising:
   at least one hovering unmanned aerial vehicle within a physical environment, the at least one hovering unmanned aerial vehicle comprising a plurality of independently driven rotors each rotor being mounted at a distance from a center of the at least one hovering unmanned aerial vehicle and each rotor associated with a rotor motor;
   a control station in communication with a hovering unmanned aerial vehicle, the control station comprising a touch-screen interface; and
   a processing system connected to the control station and configured to
      send a signal to the control station to display, on the touch-screen interface, a visual representation of the environment and the hovering unmanned aerial vehicle;
      receive target pixel coordinates within the visual representation of the environment for the hovering unmanned aerial vehicle from the touch-screen interface;
      convert the target pixel coordinates into physical coordinates for the hovering unmanned aerial vehicle within the physical environment;

determine a desired vector to direct the hovering unmanned aerial vehicle within the physical environment based on the physical coordinates; and based on the determined desired vector, send a signal to the rotor motors of the hovering unmanned aerial vehicle to direct the hovering unmanned aerial vehicle along the desired vector.

25. The system of claim 24, wherein:

the processing system comprises a control unit within at least one hovering unmanned aerial vehicle and a control unit within the control station.

26. The system of claim 24, wherein the at least one hovering unmanned aerial vehicle comprises one or more sensors and the processing system is configured to receive data from the one or more sensors.

* * * * *